United States Patent
Frick et al.

(10) Patent No.: US 10,422,183 B2
(45) Date of Patent: Sep. 24, 2019

(54) LADDER

(71) Applicants: Rory Frick, Aledo, IL (US); Kirk Nelson, Silvis, IL (US)

(72) Inventors: Rory Frick, Aledo, IL (US); Kirk Nelson, Silvis, IL (US)

(73) Assignee: Universal Ladder, LLC, Aledo, IL (US)

( * ) Notice: Subject to any disclaimer, the term of this patent is extended or adjusted under 35 U.S.C. 154(b) by 375 days.

(21) Appl. No.: 13/856,853

(22) Filed: Apr. 4, 2013

(65) Prior Publication Data

US 2013/0292205 A1 Nov. 7, 2013

Related U.S. Application Data

(63) Continuation-in-part of application No. 13/031,578, filed on Feb. 21, 2011, now Pat. No. 9,587,434.
(Continued)

(51) Int. Cl.
*E06C 1/387* (2006.01)
*B62B 1/20* (2006.01)
(Continued)

(52) U.S. Cl.
CPC .............. *E06C 1/387* (2013.01); *B62B 1/208* (2013.01); *E06C 1/22* (2013.01); *E06C 1/383* (2013.01);
(Continued)

(58) Field of Classification Search
USPC ....................... 182/1, 152, 161, 21
See application file for complete search history.

(56) References Cited

U.S. PATENT DOCUMENTS

| 60,731 A | * | 1/1867 | Hokey | B63B 27/14 |
| | | | | 182/1 |
| 419,821 A | * | 1/1890 | Burrows | E06C 1/383 |
| | | | | 182/161 |

(Continued)

FOREIGN PATENT DOCUMENTS

| GB | 2426029 A | * | 11/2006 | ............ E06C 1/387 |
| GB | 2426029 A | * | 11/2006 | .......... E04F 11/0255 |

(Continued)

OTHER PUBLICATIONS

Rod. (n.d.) American Heritage® Dictionary of the English Language, Fifth Edition. (2011). Retrieved Mar. 8, 2016 from http://www.thefreedictionary.com/rod.*

*Primary Examiner* — Katherine W Mitchell
*Assistant Examiner* — Candace L Bradford
(74) *Attorney, Agent, or Firm* — Wood, Phillips, Katz, Clark & Mortimer

(57) ABSTRACT

A ladder for use with heavy machinery such as farm equipment, the ladder having platform steps, the ladder being convertible between a deployed position for supporting a person or other load, to a storage, scaffold, or ramp position in which the steps lie in a generally planar arrangement. When deployed, the ladder steps remain parallel to each other. The ladder includes two frames, the frames pivotably connected by a plurality of platform steps, one of the frames being pivotably attached to a piece of heavy machinery. The frame nest within one another in the storage configuration. The pivotable attachment to the heavy equipment may be wheels on the ladder frame that engage horizontal tracks on the heavy equipment, allowing the ladder to be lifted up, the frames nested, and the ladder in the storage configuration slid along the tracks and stored.

14 Claims, 24 Drawing Sheets

Related U.S. Application Data

(60) Provisional application No. 61/620,790, filed on Apr. 5, 2012.

(51) Int. Cl.
    *E06C 1/22*      (2006.01)
    *E06C 1/383*     (2006.01)
    *E06C 1/397*     (2006.01)
    *E06C 7/18*      (2006.01)
    *E06C 7/42*      (2006.01)

(52) U.S. Cl.
    CPC .............. *E06C 1/397* (2013.01); *E06C 7/183* (2013.01); *E06C 7/42* (2013.01)

(56) References Cited

U.S. PATENT DOCUMENTS

| | | | | |
|---|---|---|---|---|
| 538,145 | A * | 4/1895 | Allen | A47B 43/00 108/1 |
| 739,085 | A * | 9/1903 | Kamerer | A47B 57/04 108/1 |
| 1,419,834 | A * | 6/1922 | Fellows | E04F 11/04 182/1 |
| 1,791,330 | A * | 2/1931 | Sprague | E06C 1/387 182/156 |
| 2,245,825 | A * | 6/1941 | Ross | A47C 1/12 108/1 |
| 3,446,311 | A * | 5/1969 | Alfie | E06C 1/387 182/116 |
| 3,463,265 | A * | 8/1969 | Clover | E04G 1/34 182/119 |
| 3,493,077 | A * | 2/1970 | Doten | B60R 3/02 182/156 |
| 3,498,412 | A * | 3/1970 | Best | E04G 1/00 182/113 |
| 4,004,652 | A * | 1/1977 | Laboy-Alvarado | E01D 15/124 182/1 |
| 4,053,028 | A * | 10/1977 | Loix | E06C 1/20 182/1 |
| 4,119,175 | A * | 10/1978 | Herwynen | E06C 1/393 182/125 |
| 4,258,826 | A * | 3/1981 | Murray | B62B 1/002 182/103 |
| 4,493,392 | A * | 1/1985 | Alimbau Marques | E06C 1/12 182/164 |
| 4,502,564 | A * | 3/1985 | Kümmerlin | E06C 1/16 182/161 |
| 4,648,481 | A * | 3/1987 | Lee | A47C 12/02 182/106 |
| 4,989,692 | A * | 2/1991 | Min | E06C 1/125 182/166 |
| 5,279,387 | A * | 1/1994 | Swiderski | E06C 1/32 182/108 |
| 5,395,154 | A * | 3/1995 | Wang | A47D 1/02 280/30 |
| D383,336 | S * | 9/1997 | Van Der Merwe | D34/21 |
| 6,068,277 | A * | 5/2000 | Magnussen | B60R 3/02 182/127 |
| 6,189,653 | B1 * | 2/2001 | Laug | E06C 1/39 182/152 |
| 6,951,265 | B2 * | 10/2005 | Frame | B64F 1/315 182/127 |
| 6,988,586 | B1 * | 1/2006 | Perez | E06C 1/393 182/21 |
| 6,997,282 | B1 * | 2/2006 | Sharp | E06C 1/39 182/129 |
| 7,469,958 | B2 * | 12/2008 | Hastings | B60P 1/435 14/2.4 |
| 8,127,890 | B2 * | 3/2012 | Meyers | A47C 12/00 182/156 |
| 2007/0056797 | A1 * | 3/2007 | Wang | B62B 1/12 182/21 |
| 2008/0251319 | A1 * | 10/2008 | Meyers | A47C 12/00 182/161 |
| 2009/0020360 | A1 * | 1/2009 | May | B60R 3/02 182/1 |
| 2010/0147622 | A1 * | 6/2010 | Fuqua | B60R 3/005 182/27 |
| 2011/0024234 | A1 * | 2/2011 | Lin | E06C 1/387 182/161 |
| 2013/0161127 | A1 * | 6/2013 | Allred, III | E06C 1/02 182/108 |

FOREIGN PATENT DOCUMENTS

| | | | |
|---|---|---|---|
| GB | 2426029 B | * 10/2007 | |
| GB | 2426029 B | * 10/2007 | .......... E04F 11/0255 |
| WO | WO 2009025642 A1 | * 2/2009 | .............. E06C 5/04 |
| WO | WO-2009025642 A1 | * 2/2009 | ............. B60R 3/005 |

* cited by examiner

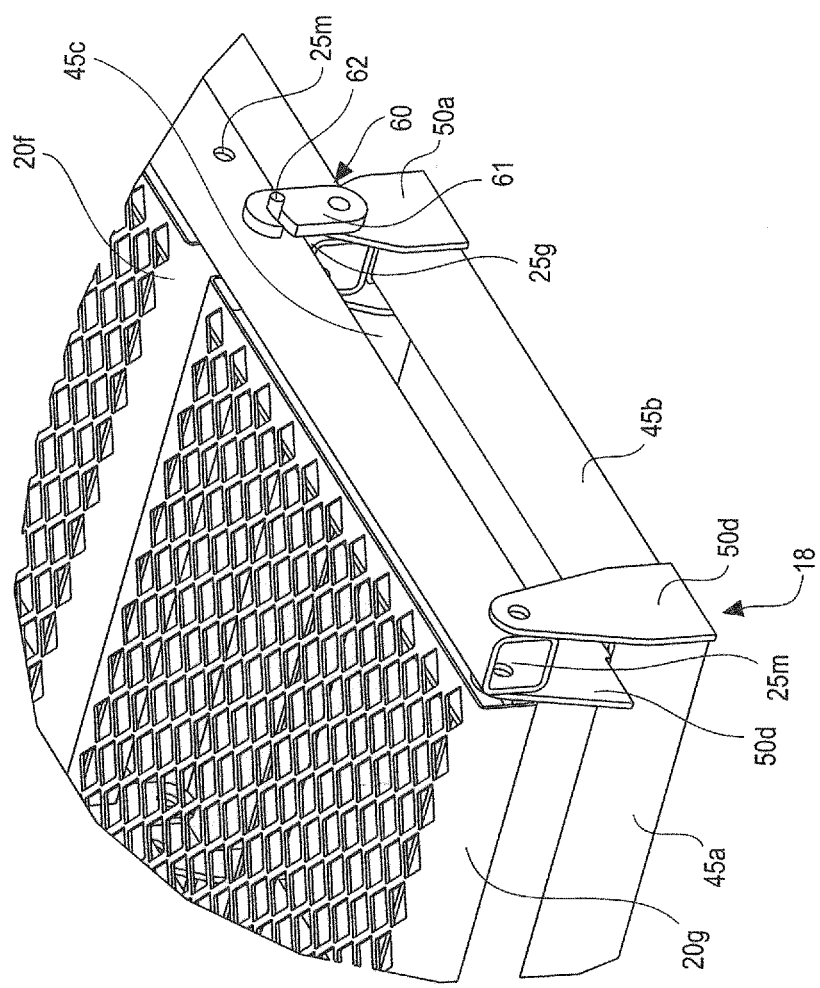

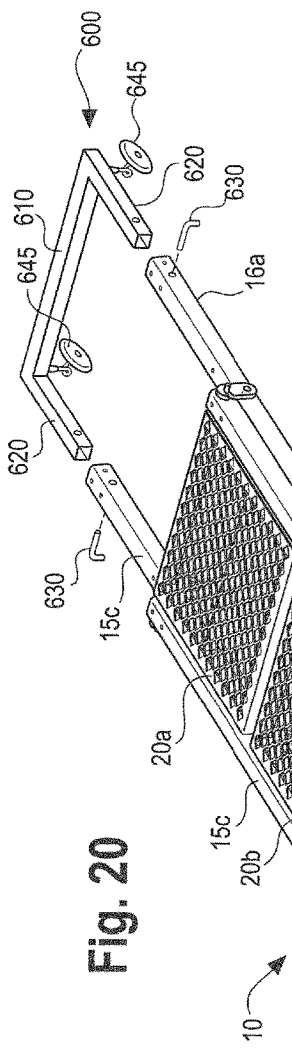
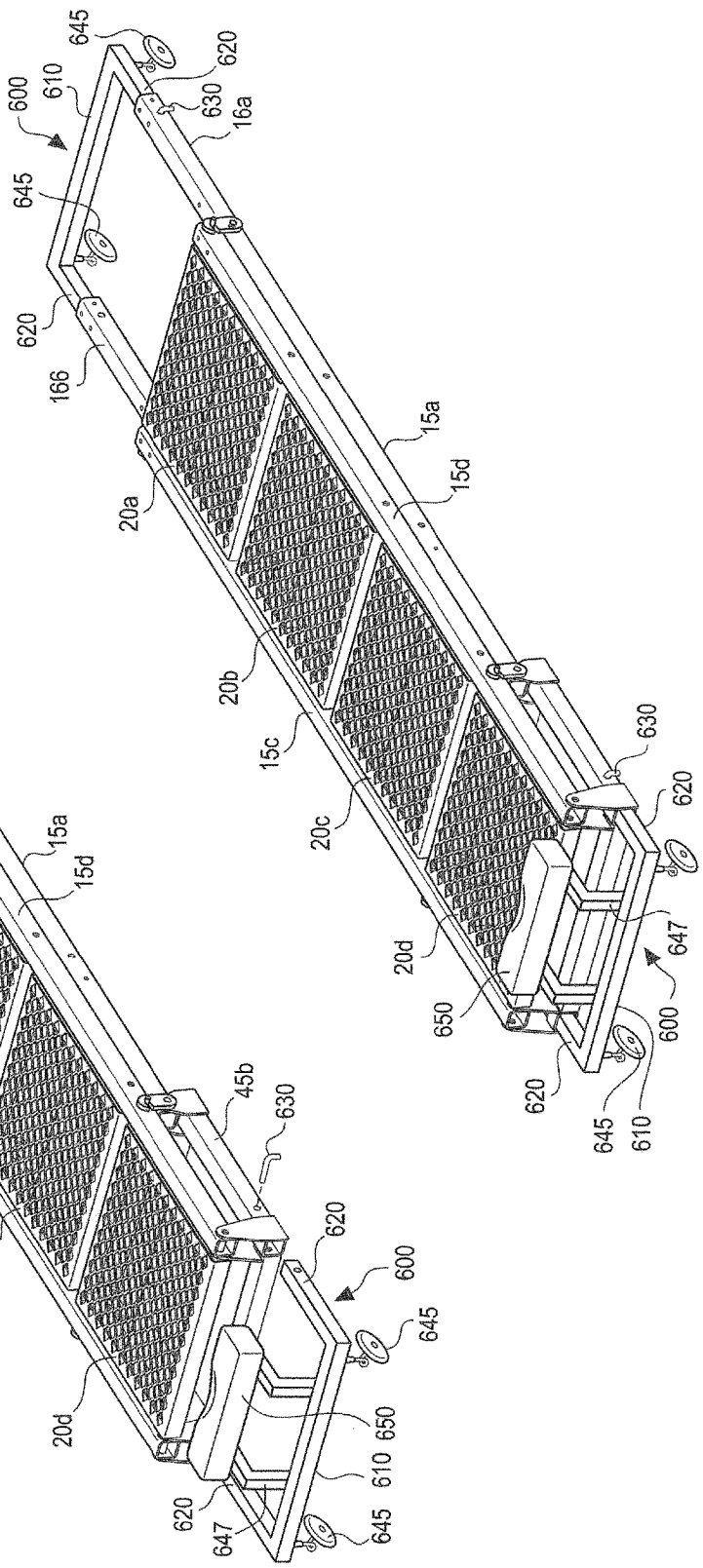

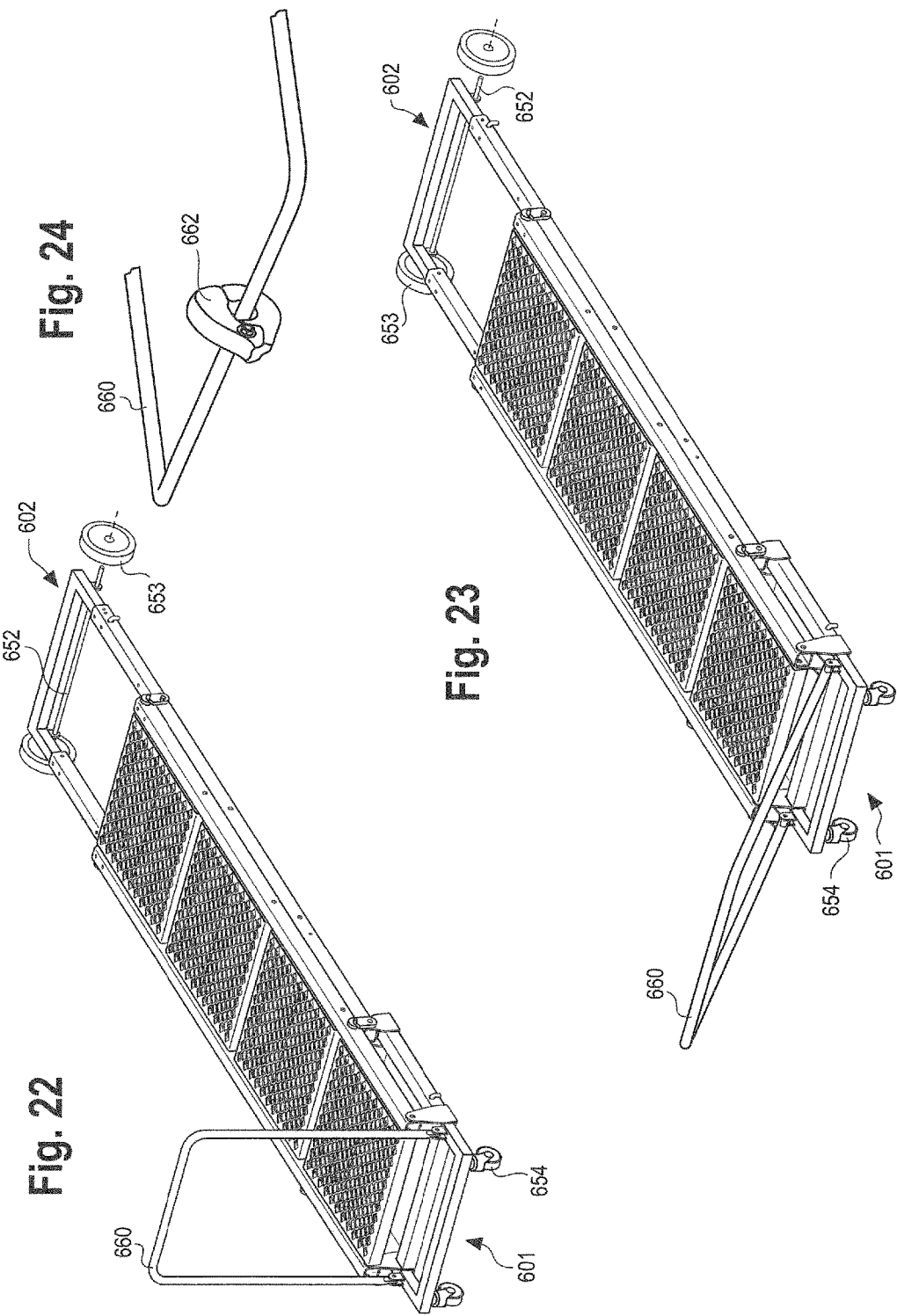

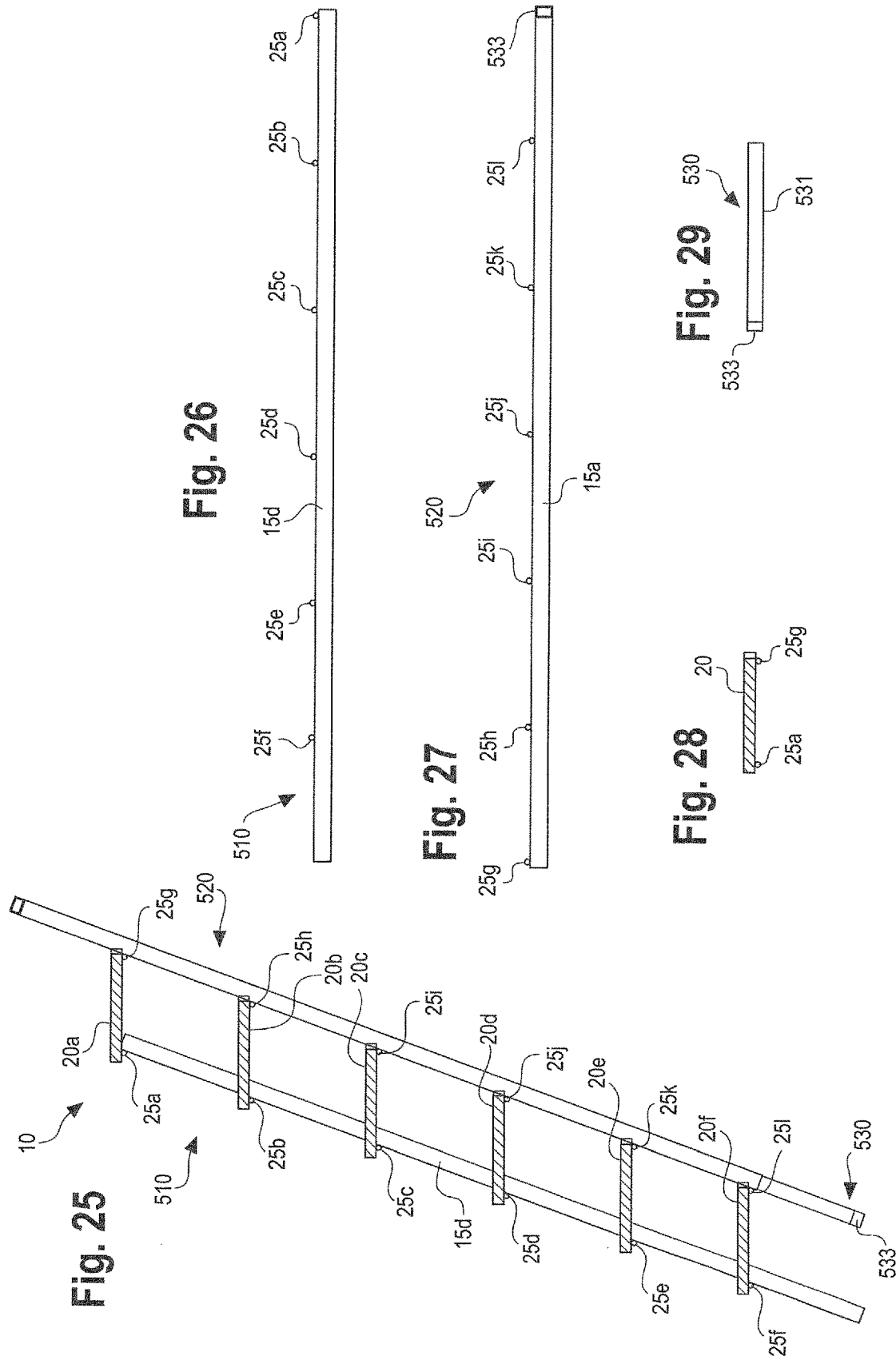

LADDER

FIELD OF THE INVENTION

The invention relates to the field of ladders and scaffolding, particularly ladders with platform steps and accessories that attach thereto. The invention also relates to creepers and hand carts. The invention further relates to ladders for use with heavy equipment, and ladders that are stowable in narrow spaces.

BACKGROUND OF THE INVENTION

The ladder of the present invention is a platform step ladder designed to allow the ladder to be positioned at various inclinations, while allowing the platform steps to remain generally parallel to the ground. In another configuration, the platform steps of the ladder can align to form a generally or substantially continuous planar surface to allow the ladder to be used as a platform or as a ramp. In alternate embodiments, the ladder of the present invention can include mechanisms to allow the ladder to be locked or secured at a particular inclination. Additionally, the ladder can include a wheeled base to allow the ladder to be moved from place to place. In further embodiments of the invention, the ladder is constructed to accept accessory bars to permit the attachment of accessories such as wheels, to allow the ladder, when in the platform configuration, to be used as a creeper. Other accessory bars include wheels and a handle to allow the platform to be used as a cart. Other accessory bars include hooks or pads to be used on the top end of the ladder when the ladder is deployed.

SUMMARY OF THE INVENTION

The ladder base consists of a rectangular frame with four forward attachment brackets and four rear brackets extending upwards from the base. The ladder frame includes a plurality of ladder frame rails and a plurality of steps located between the rails. Pairs of ladder frame rails are connected by support or pivot rods, similar in form to the rungs of a conventional ladder, to form a front frame and a rear frame. In the preferred embodiment, the support rods are welded to the frame rails. In alternate embodiments, the support rods fit through apertures in the rails and are secured to the rails by welds, mechanical fasteners such as threads and nuts, or cotter pins. While the support rods may be free to rotate with respect to the ladder rails, it is not necessary. The platform or steps of each ladder link the front frame and the rear frame. The ladder frame rails attach to the brackets of the base with pivot rods welded to the ladder frame rails. In other embodiments, other means of attachment, such as rivets, nuts and bolts, pins, or other fasteners can be used to pivotably attach the rails to the base.

The steps or platforms of the ladder are free to rotate about or hinge around the support rods connecting the ladder rails. The pivot arrangement may be improved by means of fitted bushings. The steps are made of a center brace, two end brackets and three support brackets with a tread plate on the top side of the bracket weldment. The steps are secured to the frame with support or pivot rods inserted through the steps and welded to the frame rails. At the ends of the ladder frame are four locking brackets that engage the lock pins to secure the assembly in the ramp or scaffold function.

When assembled, the ladder is adjustable so that it may be inclined at different angles with respect to the ground while allowing the platform steps to remain generally parallel to the base of the assembly, which is intended to be placed on the ground. As the ladder frame rails rotate with respect to the base, the steps and base act to keep the four rails parallel at any pitch angle. When the ladder is collapsed, the steps line up to form the surface of a scaffold or ramp.

At or near the top end of the ladder frame, various attachments can be added for certain applications, allowing the ladder to attach to or interface with another object, such as a rail on the side of a farm implement or a receiver mounted on a flatbed trailer. Of course, the ladder can be deployed free-standing against a wall or other structure, or attachments such as hooks, a roller and track configuration or a bracket assembly for securing to a flatbed type semi trailer. Pneumatics or hydraulics could also be implemented to actuate one pair of the rails to quickly flatten the ladder to make a ramp or slide. In other embodiments, supports or jacks between the ladder rails and the ground or other reference surface can be used to secure the ladder at a particular inclination.

The ladder is also constructed to receive accessory bars that allow features to be selectively attached and removed from the ladder. Specifically, the accessory bars equipped with a headrest and swivelable wheels, disclosed herein allow the ladder, when in the stowed or platform configuration, to be used as a creeper for accessing height restricted areas such as the underside of a trailer, car, or truck. Other accessory bars can include non swivelable wheels such as those mounted on an axle extending across the accessory bar or also included an upright handle that is selectively locked in an upright or first position, but allowed to pivot between the upright and horizontal position when unlocked. Providing the wheels and handle allow the ladder, when in the stowed or platform configuration, to be used a hand cart or trailer.

The ladder of the present invention can be described as having three main components:
1) Ladder frames
2) Ladder base and steps
3) application/attachment assembly 1) Ladder Frame:

Components of ladder frames include a plurality of rails, and a plurality of support rods. In the preferred embodiment, four rails are used. The support rods connect pairs of rails, in a fashion similar to ladder rungs, to form what are akin to two normal ladders. The spacing of the support rods can vary depending upon the application of the ladder. The spacing of the support rods on each frame will be similar, so that the steps linking the two ladder frames will maintain the same angle with respect to each other. The two ladder frames are linked by the base and steps, the support rods pivotably or hingedly supporting the platform steps. Components of ladder frame can be assembled in a manner that when in an unfolded working position at a 45 degree pitch, ladder will give the appearance of a flight of stairs.

In addition, when the ladder frame is in a folded position or storage position, it can be used as a ramp or scaffolding, as the steps of the ladder fold to lie in a generally planar arrangement between the rails.

2) Ladder Base and Steps:

The bottom of the ladder frame pivotably attaches to brackets on the ladder base. The base includes brackets that are offset in height. The offset allows one set of frame rails to overlie another set of frame rails, allowing the ladder to fold and form a platform or scaffold surface. Once the frame is attached to base and steps are attached to the support rods, the ladder may be set at different angles, and the steps will remain parallel to the base. While the brackets may be placed at the corners of the base, it is advantageous to have the based extend some distance in front of the front set of brackets. The extension of the base provides leverage to resist the torque that may be generated by loads on the steps of the ladder when the ladder is in use. The base may also include handles on its periphery to allow ease of carrying. The handles can also provide the user a convenient handhold when deploying or stowing the ladder when the ladder is used in a track mounted configuration.

The ladder base will also provide secure footing for the ladder assembly in addition to having a locking device to be used when ladder is in a folded down position for use as a ramp or for storage. The ladder base is optional, and a ladder consistent with the invention described herein can be constructed without a base. In such an embodiment, the locking mechanism to lock the two ladder frames together is located on the steps, or on the rails.

In a ladder that does not have a base, the steps link the two ladder frames. In such an embodiment, the ends of the rails may include height adjustment devices to assist in leveling the ladder frames on uneven ground.

The linkage provided by the base and steps allows the ladder of the present invention to be used at an infinite number of pitches between 0-90 degrees, since the angle formed by the rails with respect to the ground may change, although the platform steps remain parallel to the ground and to each other. When viewed from the side, the frame rails and the steps form a parallelogram.

The ability to keep the steps parallel is of benefit if the top of the ladder is fixed to a piece of machinery, such as a farm implement or flatbed trailer. The ladder can be deployed to varying levels, such as the ground or a pickup truck bed, while the steps remain parallel to the ground in either instance.

Additionally, the ladder, when folded so that the ladder rails lie against one another, or so the base and the rails are parallel, the steps form a generally planar surface, so that the ladder can be uses as a platform or a ramp. It is recognized that in the folded configuration, the ladder frames may lie on top of one another, or they may be nested with one frame located between the rails of the second frame. The nesting allows the ladder to have a minimal height profile when in the storage configuration, since the corresponding rails of the ladder frames are next to each other rather than on top of each other. In such an arrangement, the spacing between the rails of the first frame will be less than the spacing of the rails of the second frame. In such an arrangement, the support rods that connect the rails are preferably attached to an outer surface of the rails to allow the frames to nest in a generally coplanar manner.

3) Application/Attachment Assembly:

In some applications, the top end of ladder simply rests freely against the work area. However, the ladder of the present invention can accommodate optional attachments at the top end of ladder, allowing the ladder to be more securely fixed to an object or work area. Such attachments described herein allow mounting the ladder to all types of machinery, vehicles, and buildings etc. Application/attachment assemblies may consist of one or a combination of the following. 1) Hooks attached to top of ladder may be used to secure ladder to a rod on any given fixed point. 2) Square, rectangular, round tubing or post material or any combination may be pivotably attached to the ladder, allowing the post to be placed in a suitable receiver on the work area. An example of such a receiver would be a vertical hole, receiver, or stake pocket in the frame of a flatbed trailer; 3) Any other form of receiver that will firmly secure ladder to any fixed point; 4) pads to protect any surface that the ladder rests against; 5) wheels.

The above assemblies may also be used on both of ladder ends so as when ladder is in a closed or folded position, it can be used as a form of scaffolding or ramp between two fixed points. In particular, the attachment of wheels and a headrest to the ladder in the folded configuration will allow the structure to be used as a creeper or dolly. The attachment of a handle would allow the structure to be used as a cart.

The additional assemblies or accessories may be placed on accessory bars that are selectively attached and detached from receivers on the ends of the ladder.

The ladder assembly may be made of one or more of the following materials; aluminum, steel, fiberglass, wood, composites, or any other material of suitable strength and durability.

The length of ladder assembly can be as long as desired, but also remaining within an acceptable standard of safety. Lengths will be determined according to application.

The width of ladder can also vary according to application and desire while remaining within a standard of safety.

Step construction: standard placement of step assembly within ladder frame is preferred to be 12" center to center as it is on conventional ladders from rung to rung. This can also deviate from standard if desired. Step assembly depth or length shall also be as desired. As shown in one of the alternate embodiments, the tread need not have a full depth. For example, the tread may have a depth of 6 inches where the tread support has a greater depth. If the support rods are mounted to the tread frame near the ends of the tread frame, the spacing between the two ladder frames may allow for a 10.5 inch tread, but one may use a 6 inch tread. This arrangement of the tread being substantially shorter than the tread frame or distance between the two ladder frames. This configuration does not provide the preferred surface of one wants to use the stowed ladder as a platform or ramp. If ladder is to be used as a ramp or platform it is preferred that the depth/length of the steps shall be great enough to allow steps to meet or nearly meet end to end while in folded position so as to form a generally planar, nearly continuous surface. Step assembly depth/length can be decreased if desired to allow more spacing between the steps or individual platforms when the ladder is folded.

BRIEF DESCRIPTION OF THE DRAWINGS

FIG. 2a is a close-up partial perspective view of a portion of FIG. 2.

FIG. 20 is a perspective view of a ladder in the stowed position with a first unmounted accessory bar including a headrest and swivelable wheels and a second unmounted accessory bar having swivelable wheels.

FIG. 21 is a perspective view of a ladder in the stowed position with mounted accessory bars.

FIG. 22 is a perspective view of a ladder in the stowed position with a first mounted accessory bar having a lockable and pivotable handle positioned in an upright position and wheels, and a second mounted accessory bar having wheels.

FIG. 23 is a perspective view of a ladder in the stowed position with a first mounted accessory bar having a lockable and pivotable handle and wheels, and a second mounted accessory bar having wheels.

FIG. 24 is a perspective view of the handle connected to a hitch.

FIG. 25 is a side elevation view of an alternate embodiment of a ladder for use with heavy equipment in a deployed configuration, without a base and with a bottom rail extension.

FIG. 26 is a side view of a ladder frame, including cross members attached on a top surface of the rails that form the frame.

FIG. 27 is a side view of a ladder frame, including cross members attached on a top surface of the rails that form the frame, the frame including a bottom rail extension.

FIG. 28 is a side elevation view of a tread.

FIG. 29 is a side elevation view of a bottom rail extension.

DETAILED DESCRIPTION OF THE PREFERRED EMBODIMENT

Figure 1:
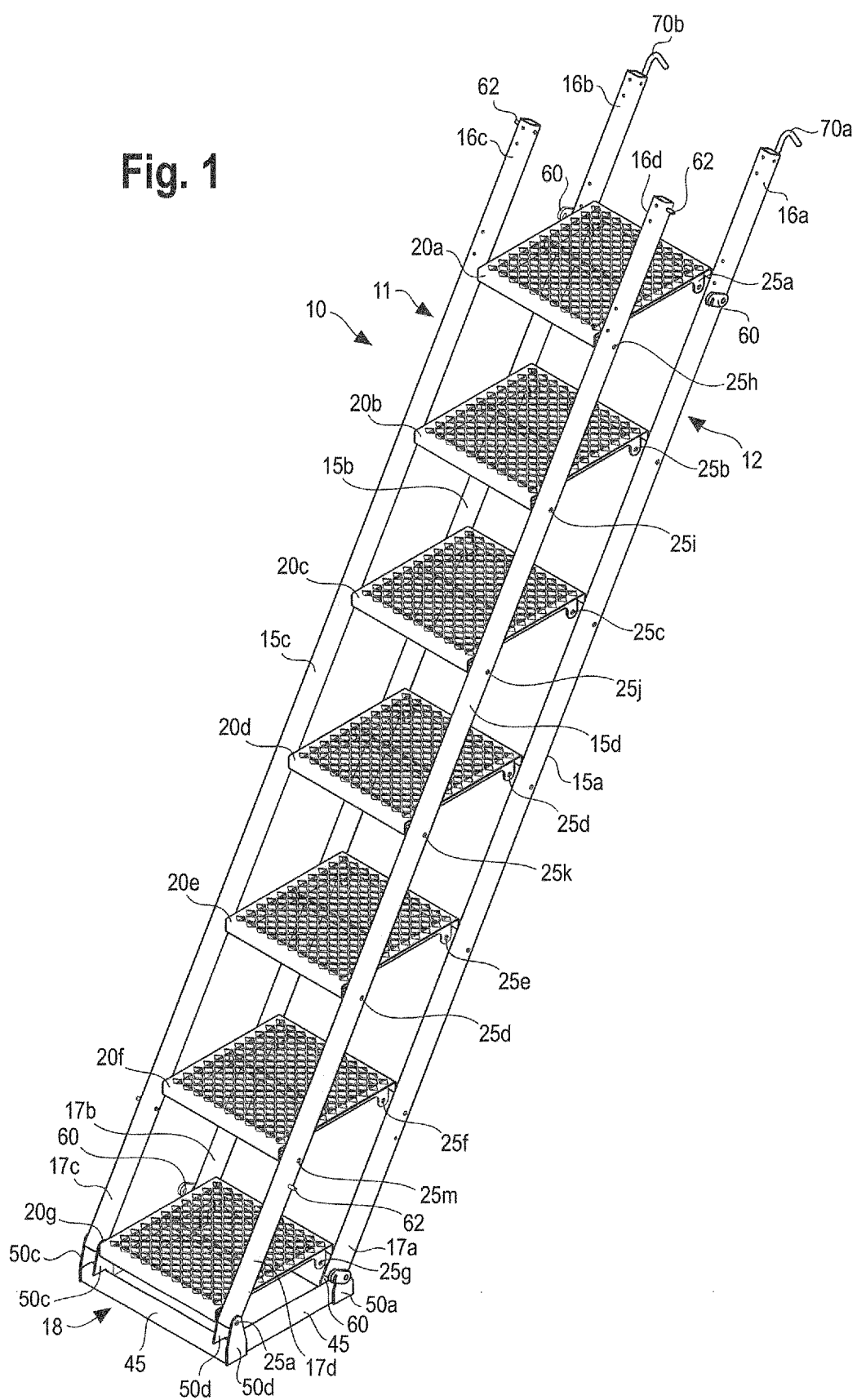
FIG. 1 is a perspective view of the ladder in a deployed configuration.

The ladder 10 includes four ladder rails 15a-d, each having a top end 16a-d and a bottom end 17a-d. Each rail 15a-d is pivotably connected at their bottom ends 17a-d to a base 18. In the preferred embodiment, the rails 15a-d are square metal tube stock, although other materials, such as solid stock, I beams, angle iron, channel stock, fiberglass, composites, and lumber, could be utilized to form the rails. It is not necessary that the rails be of tube stock. While the rails are square in the preferred embodiment, they may also be of any convenient shape. The length of the rails can vary, although for flatbed trailer applications, it is preferred that the rails be at least 60 in length. It is preferred that at least two of the ladder rails extend 48 inches above the top most step, here step 20a, to provide for a hand grip when a person is on the top most step 20a.

Each rail 15a-d is pivotally attached to a plurality of steps 20a-g positioned at generally equal intervals between the rail top ends 16a-d and the rail bottom ends 17 a-d. The intervals closely match the length of the steps 20, so that the steps form a nearly continuous surface when the ladder 10 is in the folded or ramp configuration shown in FIG. 2. In the preferred embodiment, the steps 20 are seven in number and are approximately 12 inches square.

The steps 20a-g are pivotally attached to the rails 15a-d by support rods 25a-n that extend between pairs of rails, much like the rungs of a traditional ladder. So constructed, the ladder has a first frame 11 and a second frame 12 linked together by the plurality of steps 20a-g. In the embodiments shown in the figures, support rods 25 h-n connect rails 15c and 15d to form the first frame 11. The support rods 25a-g connect rails 15a and 15b to form the second frame 12. The support rods 25a-n fit through apertures in the rails 15a-d and are secured at their terminal ends by welding the support rod ends to the outside surface of the rail. It is also possible to weld the rods at any area in which the rod and the rail contact each other. In other embodiments, the support rods need not go through apertures in the rails, but may be attached to brackets attached to the exterior surface of the rails, or attached to the surface of the rails themselves without the need for brackets. One skilled in the art will recognize that there are may ways to attach the rods to the rails so that the rods will support the steps 20 a-g and allow the steps to move relative to the rails as the angle of the rails with respect to the ground is changed.

In other embodiments, the steps 20a-g are fastened to the rails 15a-d by fasteners, such as nuts and bolts, rivets, pins, or other fasteners known in the industry. In such embodiments, the steps 20a-g in conjunction with the fasteners act to connect the rails to each other.

Figure 3:
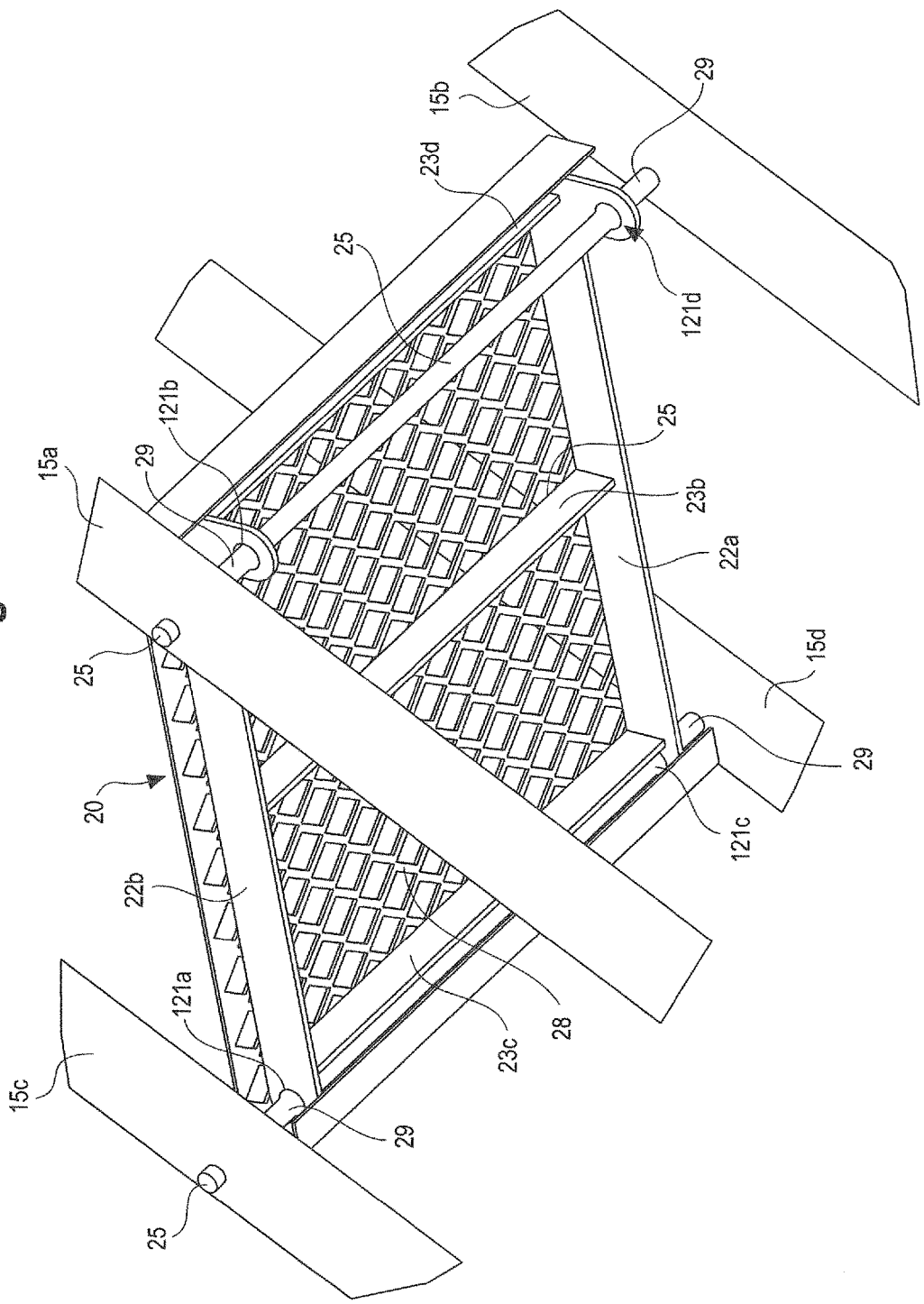
FIG. 3 is an underside partial perspective view of a representative step assembled on the ladder.
Figure 4:
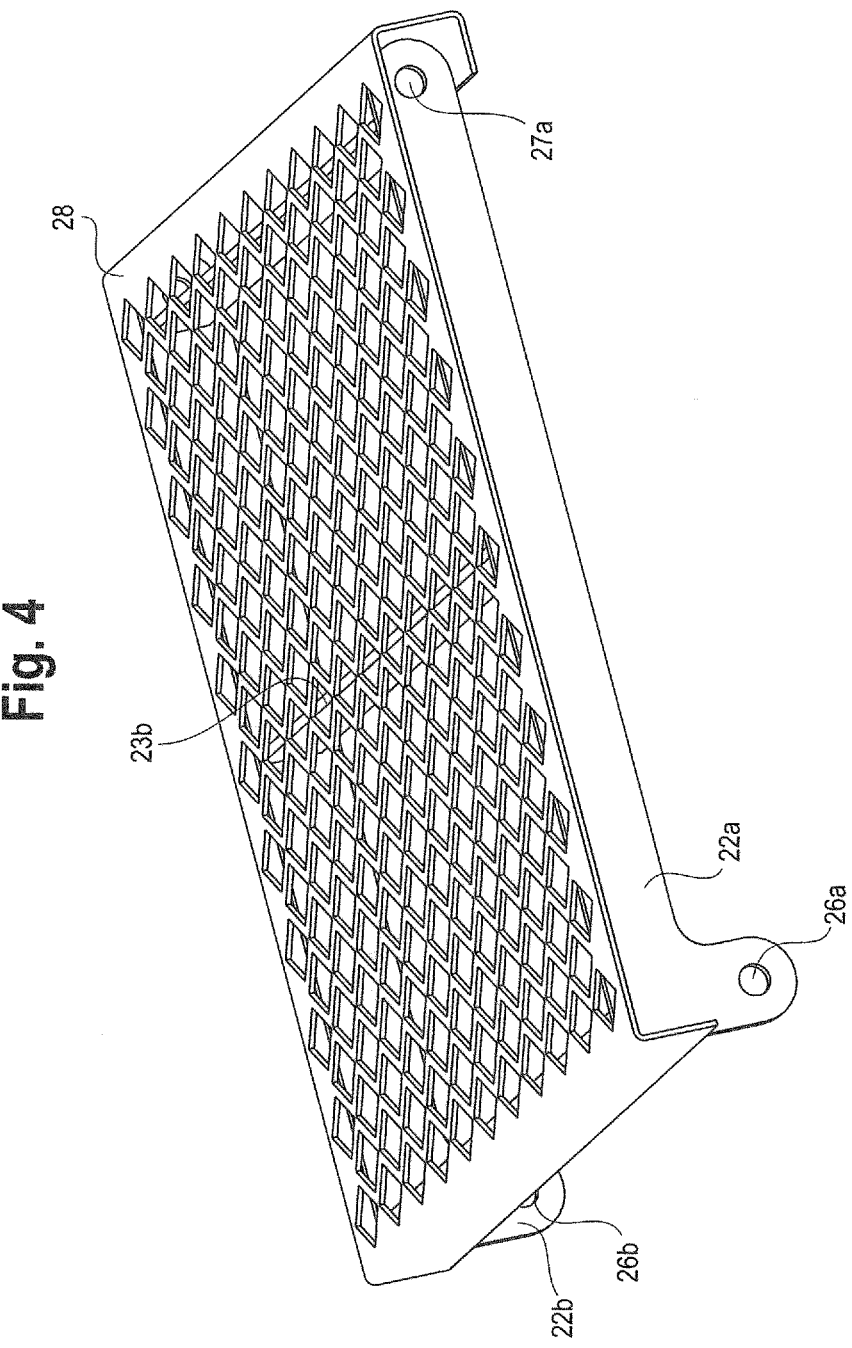
FIG. 4 is a top perspective view of a step.
Figure 5:
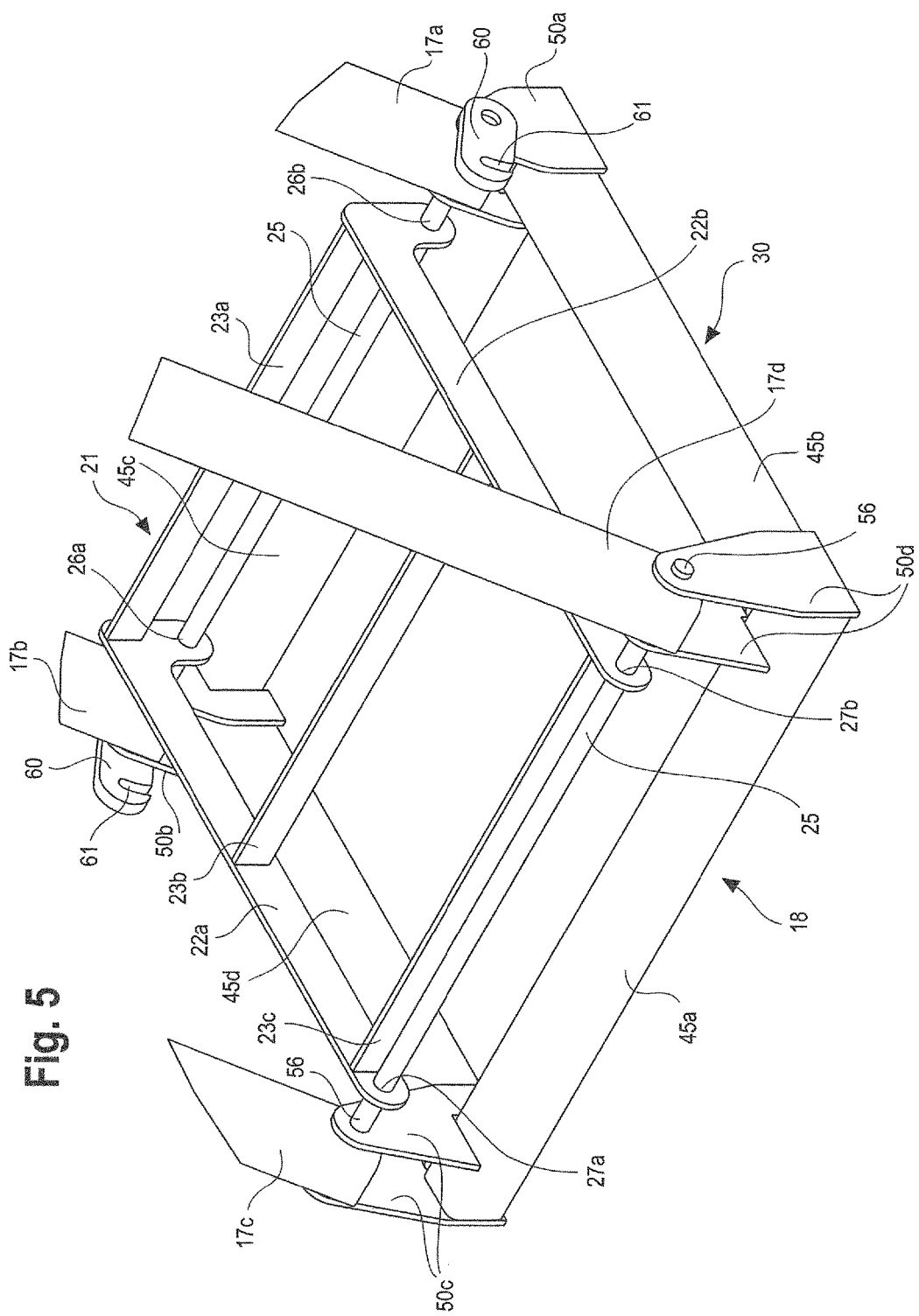
FIG. 5 is a top partial perspective view of the base and bottom step assembled on the ladder, the foot support surface of the step removed.
Figure 6:
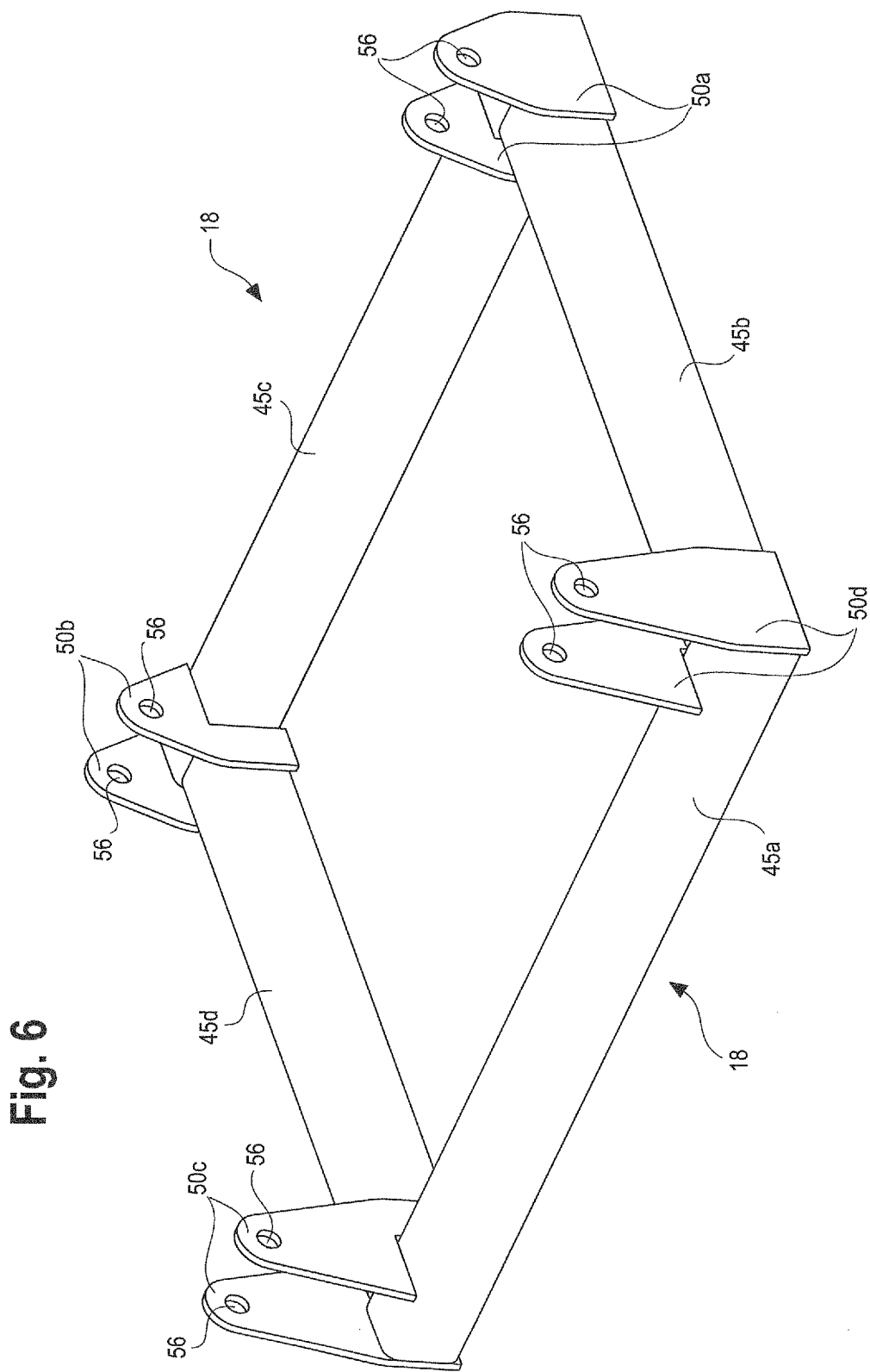
FIG. 6 is a top perspective view of a base.
Figure 7:
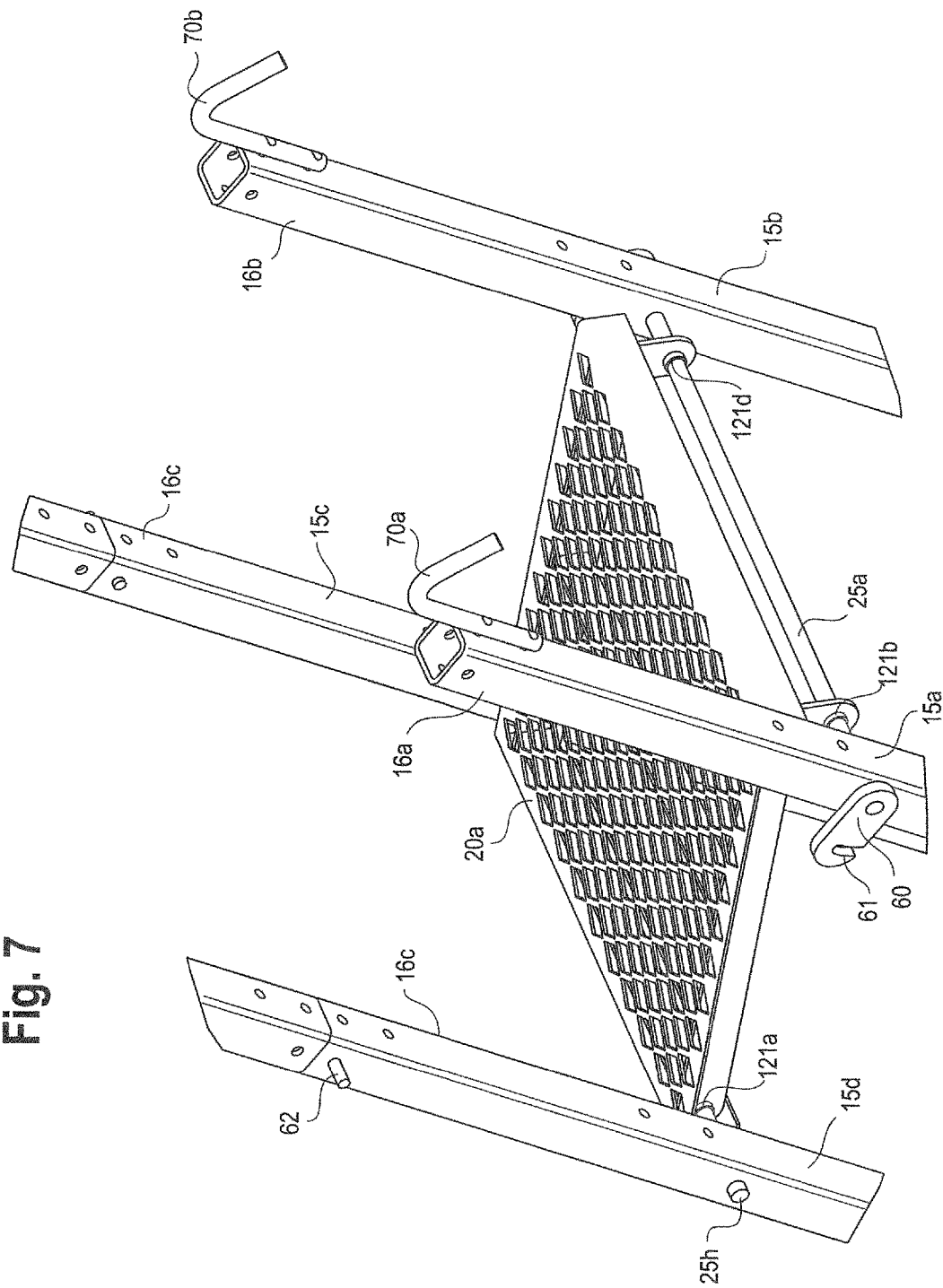
FIG. 7 is a top partial perspective view of the top step assembled on the ladder.
Figure 8:
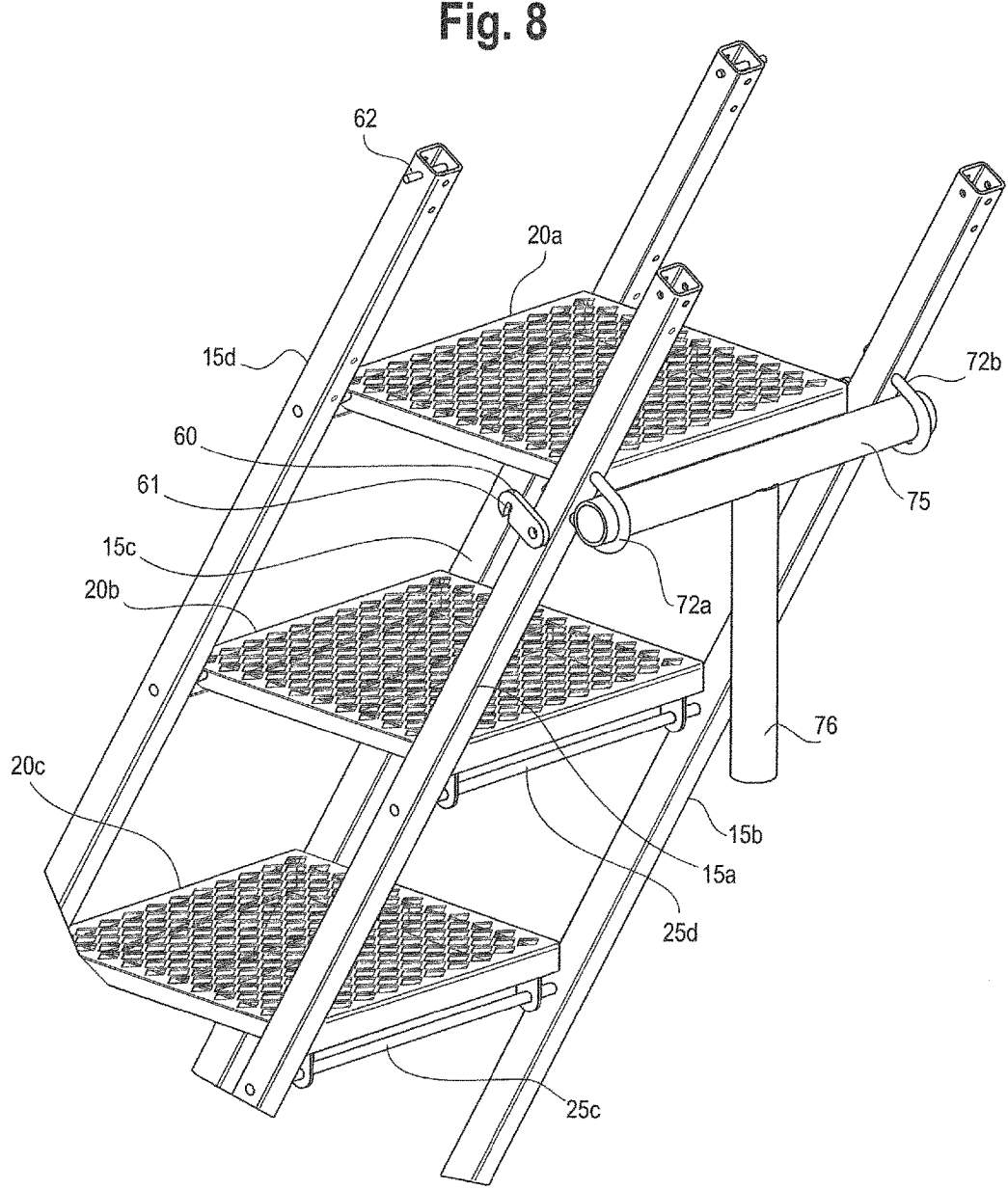
FIG. 8 is a top partial perspective view of the top of the ladder with a staker.
Figure 9:
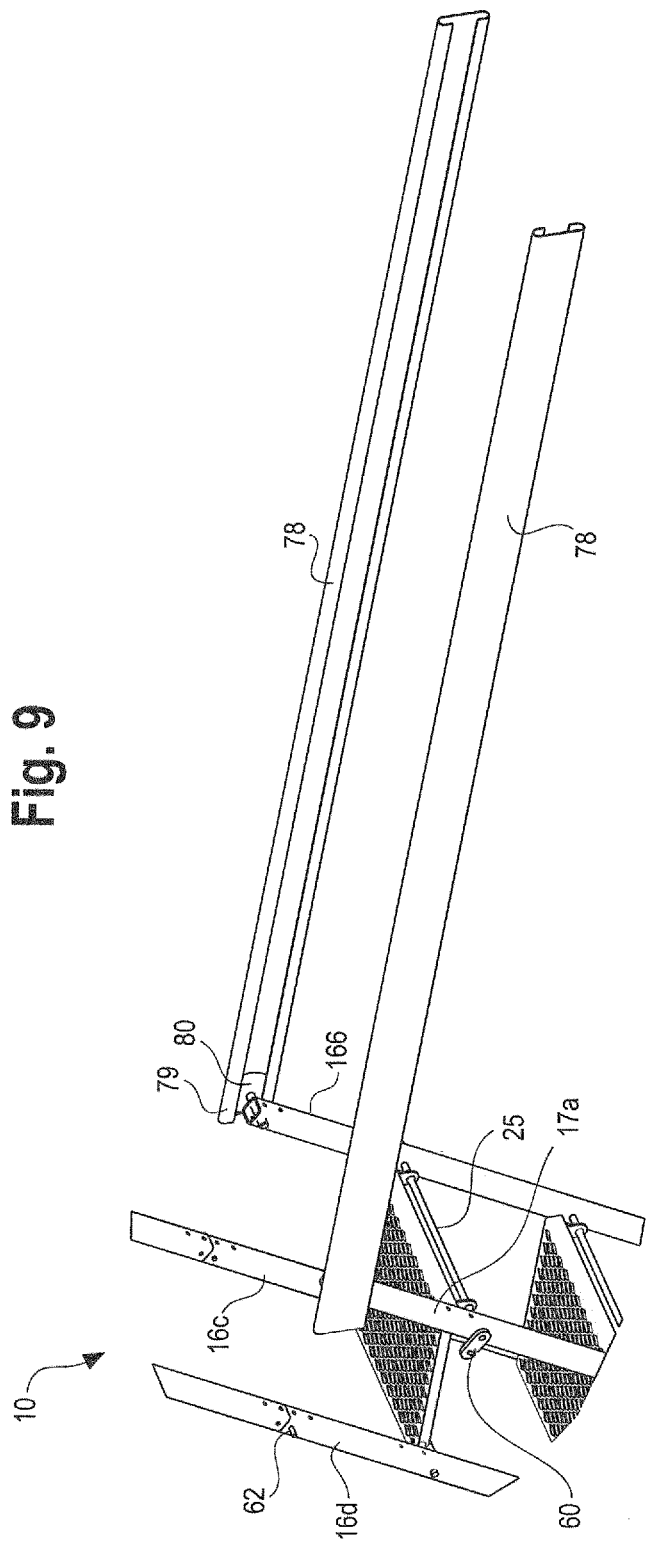
FIG. 9 is a top partial perspective view of the top of the ladder attached to rollers and track.

The steps 20a-g are shown in detail with reference to a single step in FIGS. 3-5. The steps 20 are generally 12 inches square, but one skilled in the art will recognize that the dimension of the steps may be change to suit the application. Each step includes a frame 21 formed by a pair of side members 22a and 22b spaced apart by cross members 23 a-c. The members are preferably joined by welding. A tread plate or other foot support surface 28 overlies the frame 21.

The side members 22a and 22b include apertures to accept a support rod 25. The side members 22a and 22b can be "L" shaped to allow pairs of apertures 26a-b and 27a-b to be offset vertically. The vertical offset is generally the same as the height of a rail, the offset allowing the rails to lie against or in close proximity to one another when the ladder 10 is in the folded, collapsed, storage, or ramp configuration shown in FIG. 2. In other embodiments, be side members can be straight, and include downwardly extending brackets to produce the offset. A bushing 121a-d may be placed in the apertures to allow the step 20 to rotate about the rod 25 in an improved fashion. The steps may be spaced apart form the rails by spacers that fit over the rods, the spacers having a diameter larger that the diameter of apertures in the brackets attaching the steps to the rods so as to keep distance between the rails and the steps.

In alternate embodiments, the brackets are planar metal members with an aperture to accept the rods 25, or other fastener, and thereby allow the step 20 to rotate with respect to the rod 25 or other fastener. In alternate embodiments, the bracket 30 may be fixed to the fastener, rod 25, or other member, and the fastener allowed to rotate with respect to the rail 15. The apertures in the brackets are offset vertically by a distance equal to the overall height of one rail. The bracket will also allow a surface for welding the support rod in a metal construction.

Figure 2:
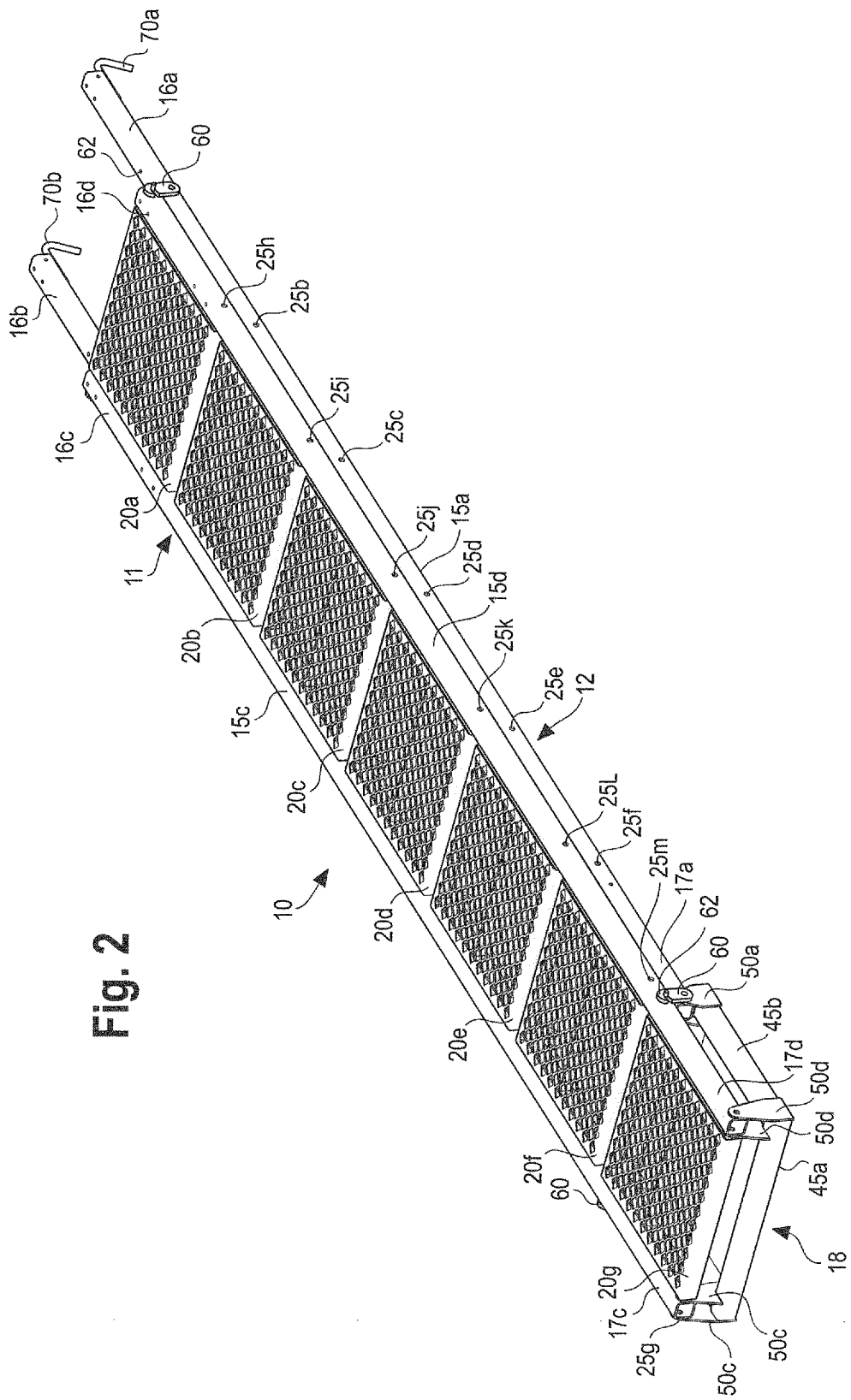
FIG. 2 is a perspective view of the ladder in a stowed or scaffold configuration.

The offset of the apertures 27a-b and 27a-b in the side members 22a and 22b is approximately the width of a side rail 15 from front to back. In the preferred embodiment, the offset is approximately 1.25 inches. This offset allows the ladder to form a platform when in the stowed configuration by allowing the rails 15 b and 15 c to lie in close proximity or against each other, as shown in FIG. 2. Thus, the offset is controlled somewhat by the width of the rails and the placement of the apertures in the rails.

In other embodiments, a step 20 may be constructed out of a single piece of material. Such material may include metal, wood, plastic, composites, or any other material known to one skilled in the art. For instance, the step 20 may be made as a blow-molded piece of plastic. Such a step may include reinforcing ribs made of plastic or some other material such as metal, but may not necessarily need such reinforcement. The single piece step may include a first set of apertures and a second set of apertures vertically off-set from the first set of apertures.

The base 18 of the preferred embodiment includes a frame composed of four side members 45a-d connected to form a rigid structure. The base 18 is preferably a welded fabrication consisting of two end tubes 45b and 45d and two side tubes 45a and 45c of the same stock size as the rails 15a-d. One skilled in the art will recognize that other sizes and materials may be used to construct the base 18. The end tubes 45b and 45d and the two side tubes 45a and 45c form a frame that is generally rectangular with dimensions allowing that the rails of the first frame 11 will be separated by at least the overall width of one step assembly, and is the foundation for the hinge brackets.

The hinge brackets 50a-d connect the four rails 15a-d with a minimal amount of free-play, but to allow for free rotation. The hinge brackets holding the first frame 11 are preferably spaced apart on the base 18 from the brackets holding the second frame 12 at the same distance that horizontally separates the apertures on the side member 22. The hinge brackets 50 a-d are generally upstanding planar members that include apertures 56 to accept the connecting rods 25. The apertures are vertically offset by approximately the same distance as the apertures 26a and 27a of the steps 20 in order to allow the ladder 10 to fold into a generally flat configuration. In such a folded configuration, the steps 20a-g form a support surface. When in a folded configuration the first frame 11 lies over the second frame 12. In the folded configuration, the first frame 11 is displaced from the second frame 12 in the horizontal direction by the horizontal distance between the apertures 26 and 27 of the step 20 side member 22.

It is preferred that there is structure to secure the ladder 10 in the folded or platform position shown in FIG. 2. In the preferred embodiment, the locking structure secures the first frame 11 to the second frame 12. On skilled in the art will recognize that other components can be secured together to maintain the ladder 10 in the platform or folded configuration.

As shown in FIG. 2a, the locking structure includes a lock plate 60 with a slot 61 to engage a locking pin 62 and a hole to attach to one end of one support rod 25. Such structure can be placed at or near the ends of the rails on both sides of the ladder 10, as shown in FIGS. 1 and 2. The lock plate 60 is a generally planar member. The slot 61 is offset from the hole a distance equal to the overall height of one rail 15, and is shaped so that the slot 61 is a small section of a circular arc of a radius that is equal to the overall height of one rail 61. This will allow the lock plate 60 to engage the lock pin 62 smoothly over an angle of approximately 16 degrees. In this arrangement, the support rod 25g is not fastened to the bracket 50a or rail 15, but directly to the lock plate 60 itself allowing for free rotation of the entire length of the support rod 25g.

The top end 16a and 16b of the rails 15a and 15b may include accessories to allow the ladder 10 to attach or interact with work surfaces or other objects. The top ends 16a and 16b need not be the extreme terminus of the rails 15, but are generally beyond the midpoint of the rails. The top ends 16a and 16b may include hooks 70a and 70b. The hooks 70a and 70b may be formed as an integral part of the rails 15a and 15b, or be separate components attached to the rails by welding, fasteners, or other means or structures known in the art to attach components together.

The top end may also include brackets 72a and 72b to accept a generally "T" shaped stake or post 75. The post 75 is a structure that allows the ladder to be fixed to another structure such as a flatbed trailer. The post 75 includes a portion that is affixed to the other structure and a second portion that is allowed to rotate with respect to the rails 15 of the ladder 10. In the preferred embodiment the post 75 includes a horizontal portion that is free to rotate in the brackets 72, thus allowing the post 75 to rotate with respect to the rails about an axis that is parallel to the plane of any one of the steps 20a-g. The post 75 has a downwardly extending appendage 76 that can be accepted by a receiver 90, such as a hole in the frame of a flatbed trailer. One skilled in the art will recognize that other receivers can be used to accept the post 75 and that other configurations can be used for the r post such that the post can be fixed to an object and allow the ladder to rotate about the post 75.

The top ends 16a and 16b may include wheels 80 or other rolling members. The wheels 80 can interact with track 78 mounted to a work surface such as a piece of heavy equipment or flatbed trailer. The track is preferably mounted in a horizontal position, with an end 79 presented or exposed to a user. The track has a length that is preferably equal to the length from the place on the rail that the wheel is mounted to the base of the ladder. This arrangement allows the ladder to be placed in its flat or stowed configuration and then slid along the tracks 78 to be stowed. In such a stowed configuration, the ladder 10 can also be used as a work platform, as the tread plates 28 of the steps 20a; g will form a generally planar surface.

Figure 10:
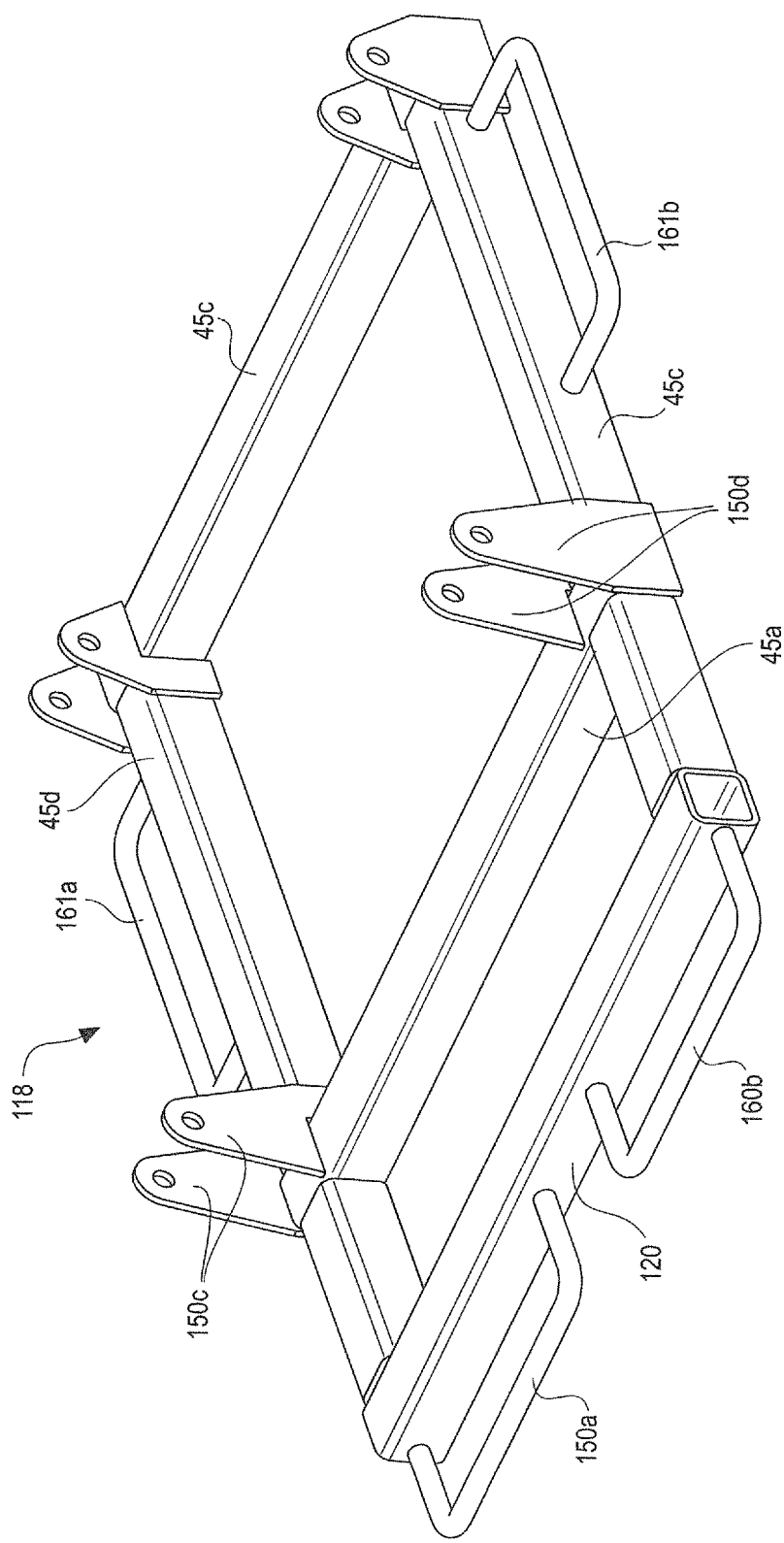
FIG. 10 is a top perspective view of a base having stability extensions and handles.

In an alternate embodiment shown in FIG. 10, the base 118 can include an extension 120 that extends in front of brackets 150c and 150d. Described another way, the brackets are not placed at the corners of the base 18, but are instead displaced from the corners. The extension 120 may include handles 160a and 160b. Handles 160a and 160b may be placed on the sides of the base 118. In other respects, the base 118 is similar to base 18.

Figure 11:
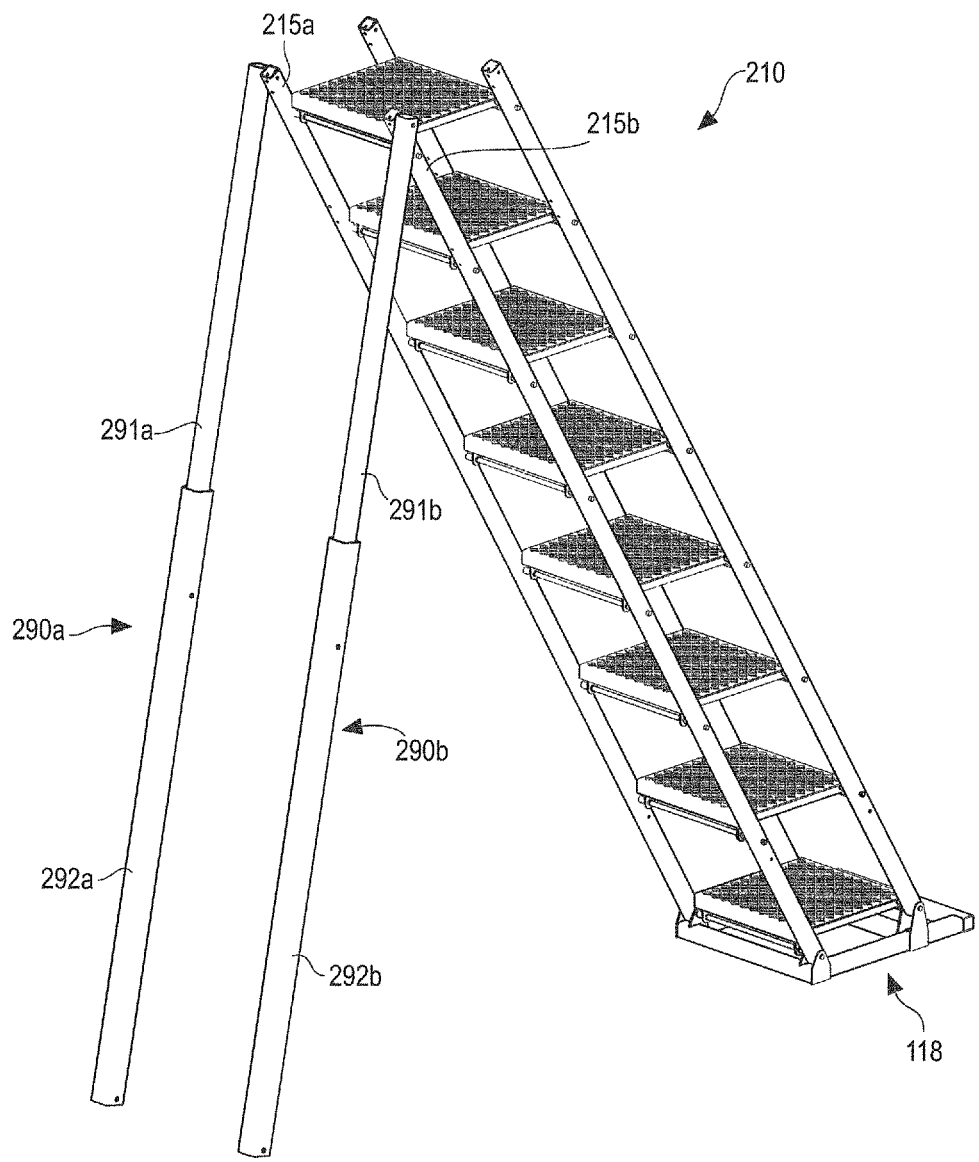
FIG. 11 is a perspective view of a ladder with supports to adjust the inclination of the ladder.
Figure 12:
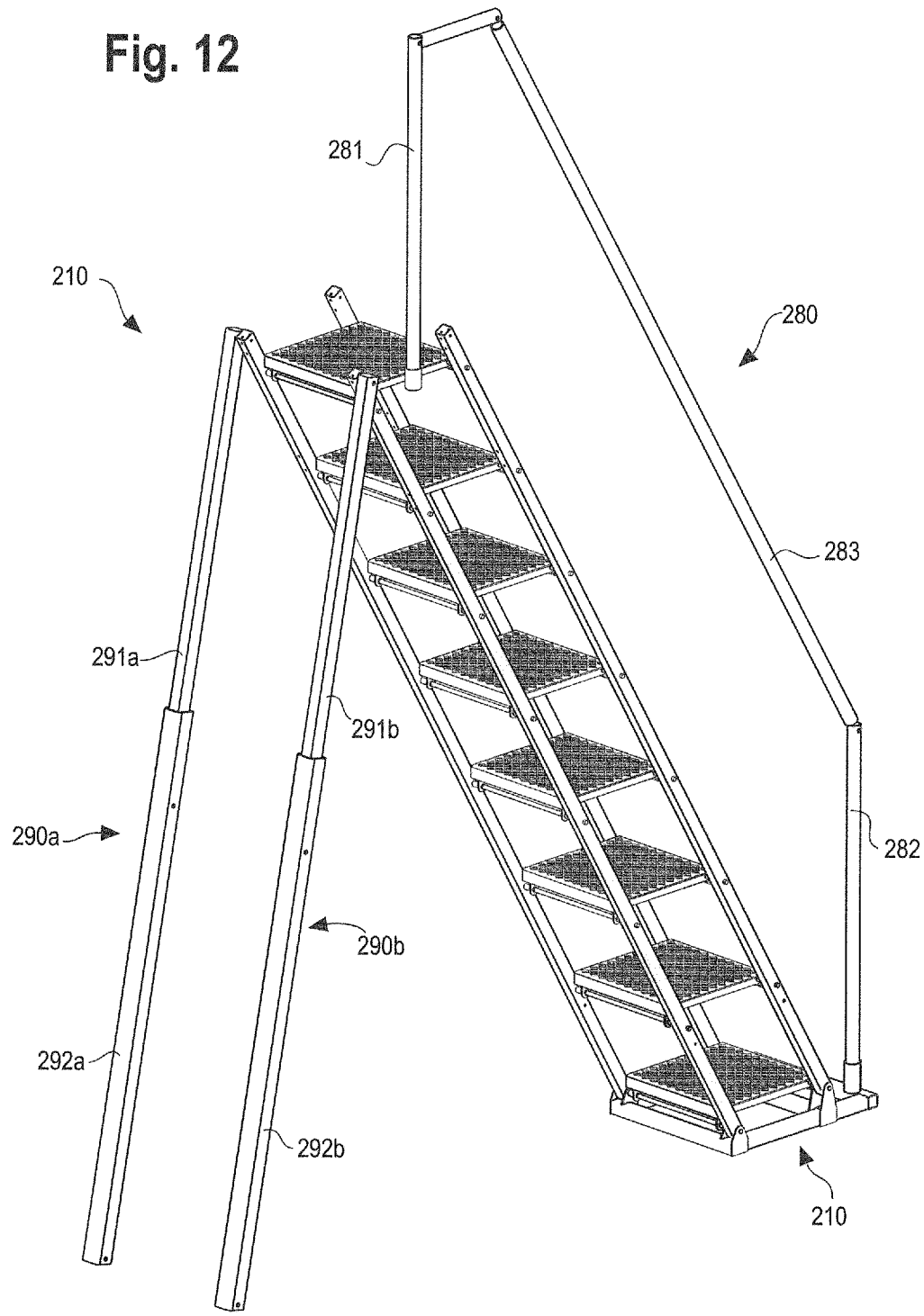
FIG. 12 is a perspective view of a ladder with supports to adjust the inclination of the ladder and a handrail.
Figure 13:
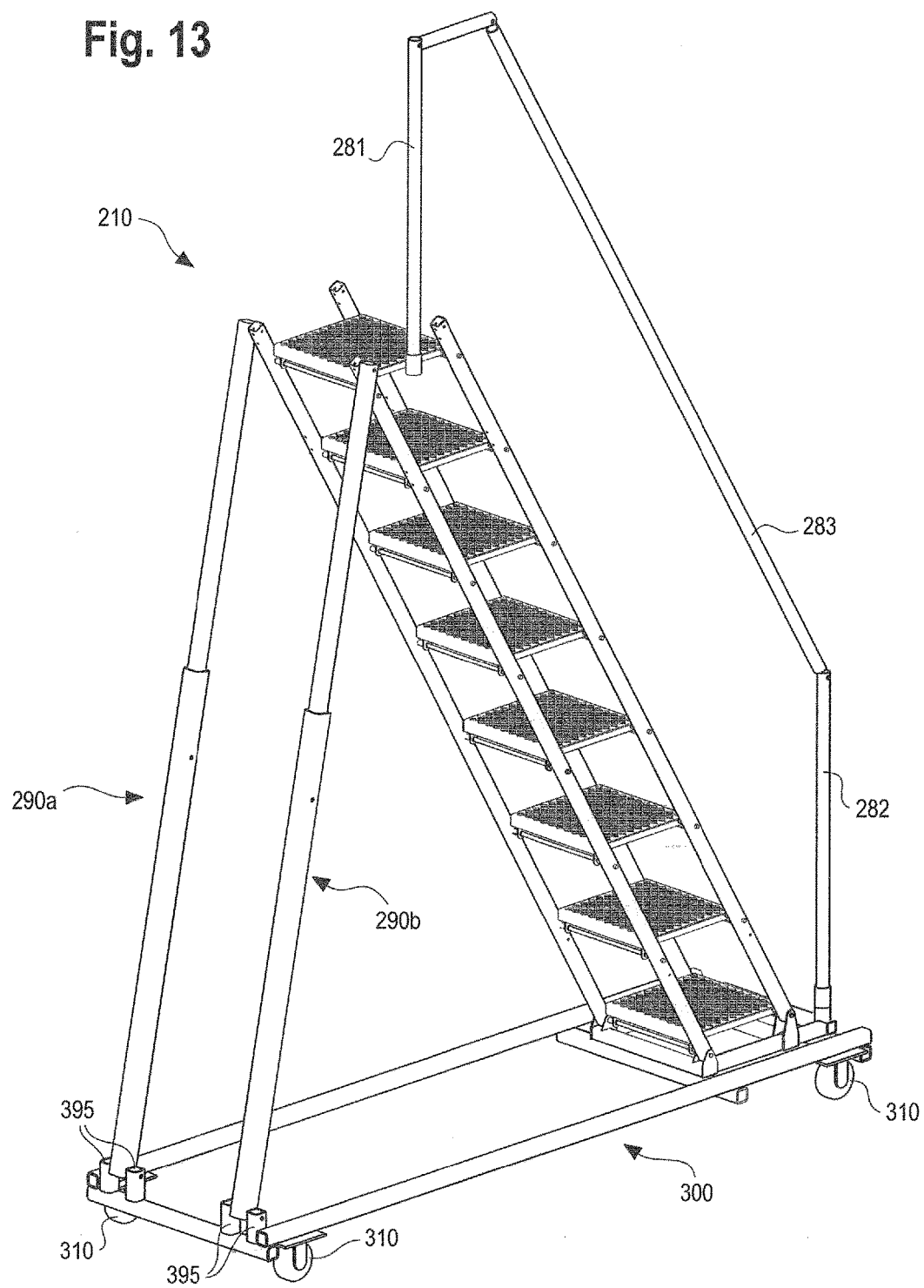
FIG. 13 is perspective view of a ladder with supports to adjust the inclination of the ladder, a handrail, and a wheeled base.
Figure 14:
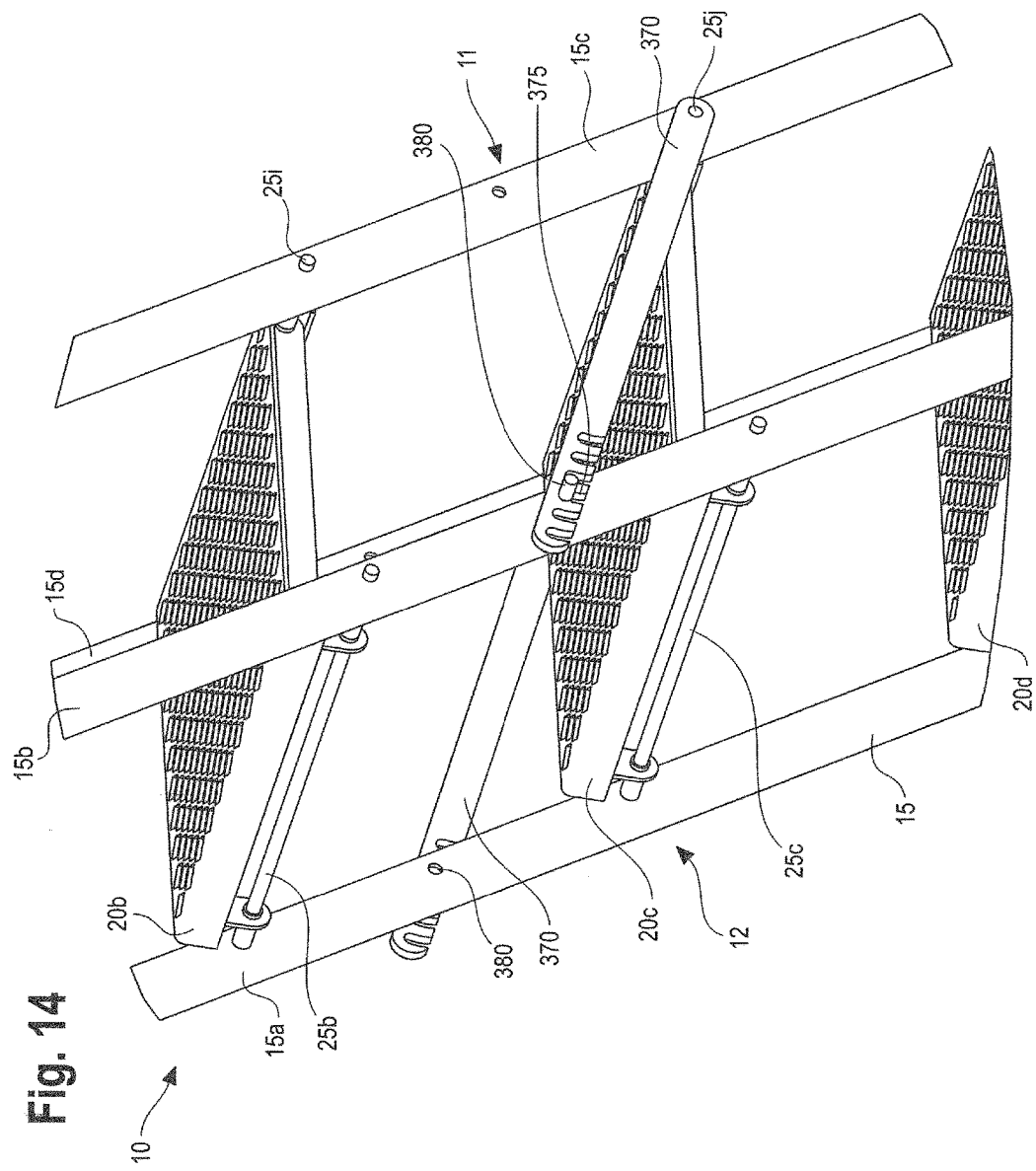
FIG. 14 is a partial perspective view of a linkage for adjusting the inclination of the ladder.

In alternate embodiments as shown in FIGS. 11-13, the ladder 210 can be supported by supports 290a and 290b. The supports have one end pivotably attached to the ladder frame rails 215a and 215b, preferably at the rail top ends to improve leverage. However, they may be positioned anywhere along the length of the rails, or may be pivotably attached to any other members of the ladder frame.

The supports 290a and 290b can be adjusted to vary the inclination of the ladder 210. The supports 290a and 290b can be adjusted by allowing first support members 291a and 291b to slide within the second support members 292a and 292b. The sliding members may be fixed in place by a pin placed in apertures, locking collars, or other means known to secure sliding members. In other embodiments, the supports may be pneumatically or hydraulically operated.

The alternate ladder may include a handrail assembly 280 shown in FIGS. 12 and 13. The handrail assembly 280 includes a first upright or stanchion 281 fixably mounted to the uppermost step, and a second upright or stanchion 282 fixably mounted to the base 210. The stanchions are pivotably connected to a handrail 285 that extends there between.

In other embodiments, the ladder, such as the ladder 210, can be mounted on a wheeled frame 300, to allow the ladder to easily be moved from place to place. The wheeled frame 300 includes wheels 310 mounted near the corners. The frame includes brackets 395 to pivotably mount the supports 290a and 290b.

In any of the ladder embodiments, the ladder may be locked in a particular inclination using a linkage 370 between the ladder side rails such as between 15a and 15d or 15b and 15c. Such linkage links the first frame 11 to the second frame 12. As shown in FIG. 13, the linkage 370 is pivotably attached to side rail 15c, and extends to side rail 15b, where one of a plurality of slots 375 engages a pin 380 to selectively lock the ladder inclination. One skilled in the art will recognize that other mechanisms or structures can be used to lock or otherwise secure the inclination of the ladder.

Figure 15:
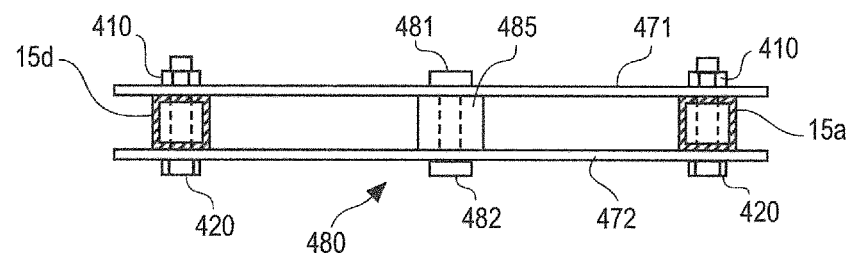
FIG. 15 is a top plan view of an infinitely adjustable linkage mounted on the ladder.
Figure 16:
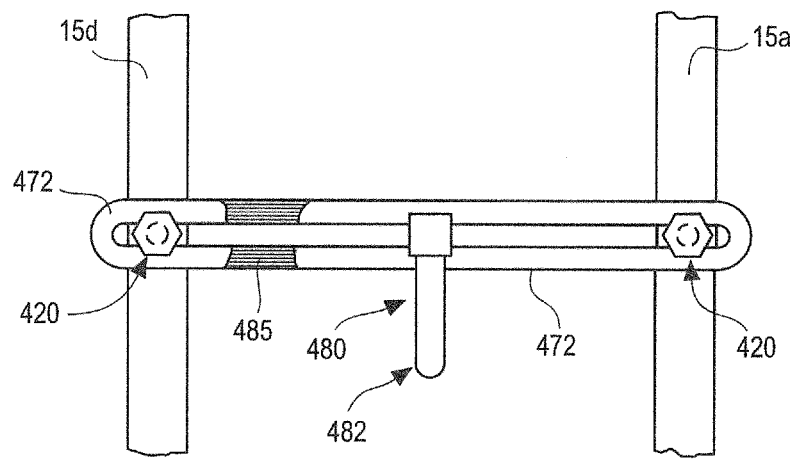
FIG. 16 is a side elevational view of an infinitely adjustable linkage mounted on the ladder.

An alternative linkage that allows infinite adjustment is shown in FIG. 15. The alternate linkage includes a first slotted linking member 471 and a second slotted linking member 472, each liking member having a slot to sunning the length of the linking member. The linking members 471 and 472 are arranged on either side of rails 15a and 15d so that the rails are between the linking members 471 and 472 and the slots of the linking members are aligned with each other. The linking members 471 and 472 are secured to the rails 15a and 15d by fasteners such as nuts 410 and bolts 420. Other fasteners can be used so long as the linking members are allowed to pivot with respect to the rails 15a and 15d. In the preferred embodiment, the connection between the linking members 471 and 472 and rail 15a allows pivoting, but does not allow the fastener to move along the slot. Thus the ladder rail 15a is translationally fixed with respect to the linking members 471 and 472. Rail 15d is not translationally fixed with respect to the liking members 471 and 472, and the fastener is allowed to slide in the slots of the linking members 471 and 472. In order to restrain or limit the translational movement, a stop 480 is placed in the slot. The stop 480 can be a nut and bolt. In the preferred embodiment, the stop 480 is a cam action lever clamp that allows the user to selectively secure and unsecure the stop at a position in the slot. The cam action lever clamp includes a stud or post 481 that is inserted in the slot and a cam action lever 482 that attaches to the post 481. A spacer 484 is paced about the post 481 to allow the clamp to grasp the linking member 472 between the lever 482 and the spacer 484, and linking member 471 between the post 481 and the spacer 484. To improve friction, the inside surfaces of the linking members 471 or 472 or the spacer 484 may include surface features such as ridges, grooves 485, or other structures to increase friction.

Figure 17:
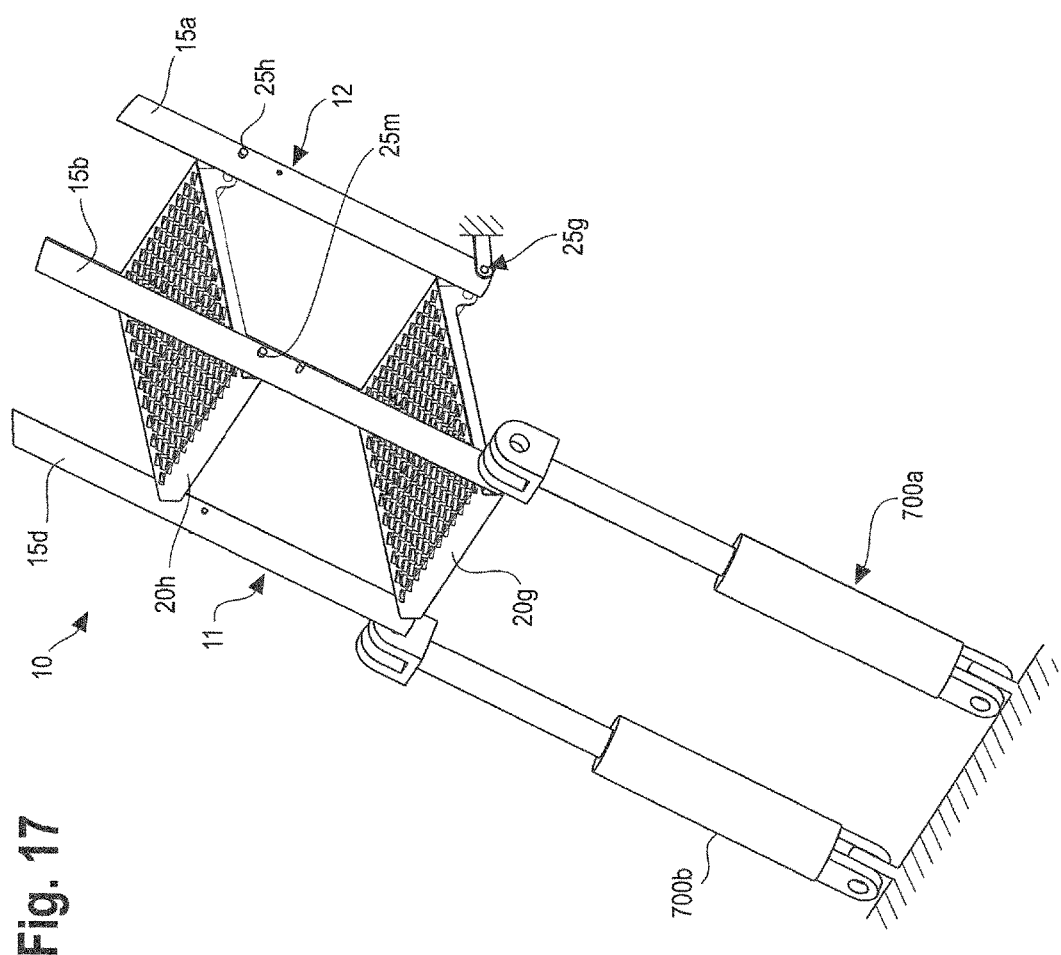
FIG. 17 is a partial perspective view of a ladder fixed to an object and having adjustable actuators to adjust the level of the steps.

In another embodiment, shown in FIG. 17, the second frame 12 is fixed or attached to another object so that the first frame is allowed to pivot about the attachment. In the embodiment shown in FIG. 17, the support rod 25g is fixed in place so that the second frame 12 can pivot with respect to it, but is fixed in other degrees of freedom of movement. The first frame is pivotably connected to adjustable actuators 700a and 700b. The adjustable actuators 700a and 700b are fixed to an object such as the object fixed to the second frame 12, or to yet another object such as the ground. The adjustable actuators are then used to adjust the angle of the steps 10 by moving the first frame 11 with respect to the fixed second frame 12.

The ladder 10 may be constructed without the base 18. In such an embodiment, it may be useful to have the bottom ends 17c and 17b of the rails 15c and 15d of the first frame 11 be slightly longer than the bottom ends 17a and 17b of the rails 15a and 15b of the second frame. The extra length will depend upon the vertical offset used on the steps 20. The additional length allows for the steps to be level when the ladder 10 without the base 18 is placed on level ground. The vertical off set is typically the height of one rail 15, as previously discussed.

The bottom ends 17a-d of the rails 15a-d may also include height adjusters. A representative height adjuster 750 is shown in FIG. 17. While only one adjuster is shown, it may be applied to any of the rails 15a-d. The adjuster 750 operates by allowing an adjuster support member 751 to slide within the rail 15. The support member is sized 751 to fit within the rail 15. The support member 751 and the rail are fixed in place by a pin placed in an aperture 752 in the rail 15, and in one of a plurality of apertures 755. In other embodiments, locking collars, or other means known to secure sliding members may be used. In other embodiments, the supports may be pneumatically or hydraulically operated. When the ladder 10 is used without the base 18, the adjuster support member 751 will contact the ground or other surface. When used with a base 18, the adjuster support member 751 may include an additional aperture 760 for attachment to the base 18 in the place of the bottom ends 17a-d of the rails 15a-d.

With reference to FIGS. 19 through 24, another embodiment of the ladder 10 is shown. In this embodiment, the ladder 10 includes structure to allow the ladder 10 to be converted into a creeper or a cart when in the platform configuration by the attachment of accessory bars 600 to the rails 15 and base 18 of the ladder 10. With the use of accessory bars 600 placed in suitable receivers on the ladder 10, wheels, pads, hooks, or other structures that may be used with the ladder in the ladder 10 or in the platform configuration can be selectively attached or removed from the ladder 10. In other embodiments, the accessories, such as wheels, pads, hooks, or other structures may be placed on posts that connect to only one receiver.

As shown in FIG. 20, the accessory bars 600 attach to the ends 16a and 16b of the ladder rails 15a and 15b or to the base 18. When the ladder rails 15a and 15b and base 18 are made of tube stock, the ends of the ladder rails 16a and 16b are open to receive the accessory bars 600. Being open, they form receivers to receive the accessory bars 600.

When the ladder rails 15a and 15b are used to receive the accessory bar 600, they may only do so when the ladder 10 is in the platform configuration, thus exposing the first ends 16a and 16b. When the ladder is deployed, the base 18 prevents the first ends 16a and 16b from receiving the accessory bar 600.

When other materials are used for construction of the ladder 10 such that the ends are not open to form receivers the ends 16a and 16b and base 18 are equipped with receivers, such as lengths of open square tube stock attached to the ladder rail ends 16 or the base 18. The accessory bars 600 are sized to fit into the open ends of the tube stock. The accessory bars 600 are preferably held in place on the ladder by removable locking pins 630 that fit into holes in the ends of the ladder rails 16a and 16b and base 18. The accessory bars 600 have corresponding holes that align with the holes in the ladder rails 16a and 16b and base 18 when the accessory bars 600 are in place, allowing the accessory bars 600 to be selectively secured. One skilled in the art will recognize that other structures can be used to selectively attach and remove the accessory bars 600.

FIGS. 19-24 show a ladder 10 of the present invention, but one that is shorter than the one shown in FIGS. 1-17. In this embodiment, which is merely an example, the ladder 10 has for steps 20a-20d. The base 18 of the ladder is also modified, but the ladder 10 is otherwise similar in construction and components. The base 18 of the ladder 10 of the embodiment shown in FIGS. 19-24 also has the tube members 45 forming the base 18, the end tubes 45b and 45d placed so that the open ends 640 of the end tubes 45b and 45d face towards the front of the ladder 10 rather than the sides. In such a position, the open ends 640 form receivers for the receipt of the ends or posts 620 of the accessory bars 630. Such a base 18 configuration could also be used on the Ladder 10 shown in FIGS. 1-17 as well.

The accessory bars 600 in the basic form include a cross member 610 and two posts 620. In the preferred embodiment, the cross member 610 and posts 620 span the width of the ladder 10 from ladder rail to ladder rail, or across the width of the base 18 for an accessory bar 600 that is attached to the base 18. In the preferred embodiment, the ladder rails 15 are positioned at the same width as the base 18, so an accessory bar 600 that fits the base 18 will also fit the ladder rails 15.

The posts 620 are positioned on the cross member 610 so that the posts 620 will fit into the ends of the ladder rails 16a and 16b, or into receivers on the ladder rails 15. The posts 620 extend from the cross member 610 approximately 5 to 8 inches and are preferably positioned at right angles to the cross member 610. One skilled in the art will recognize that the posts 620 can be of different lengths and need not be of the same length. The length of the post 620 also need not be 5 to 8 inches, and the length may be longer or shorter, although it is preferred that the posts 620 fit into the rails 15, base 18, or receiver for at least three inches so to provide stable and secure attachment.

Figure 18:
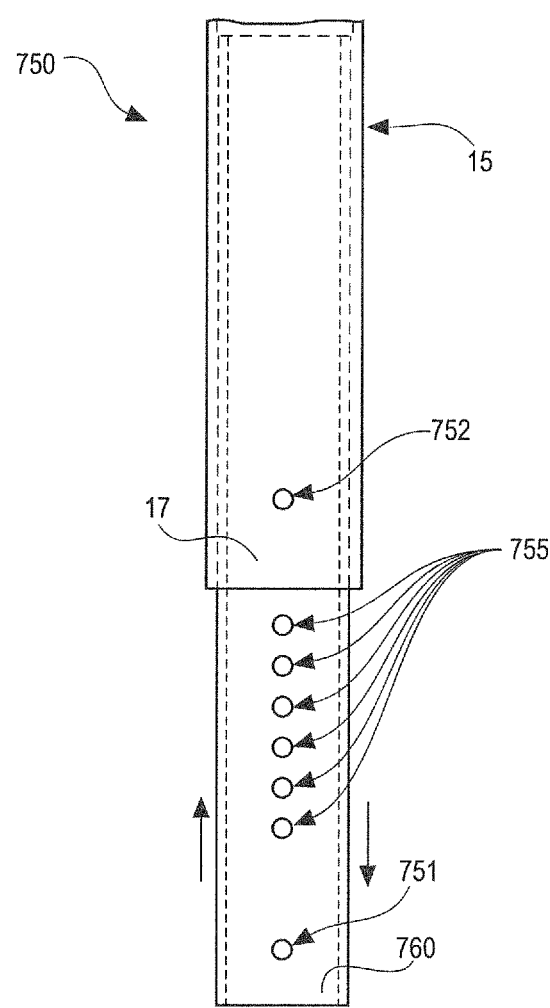
FIG. 18 is a side view of a ladder rail having a height adjuster.
Figure 19:
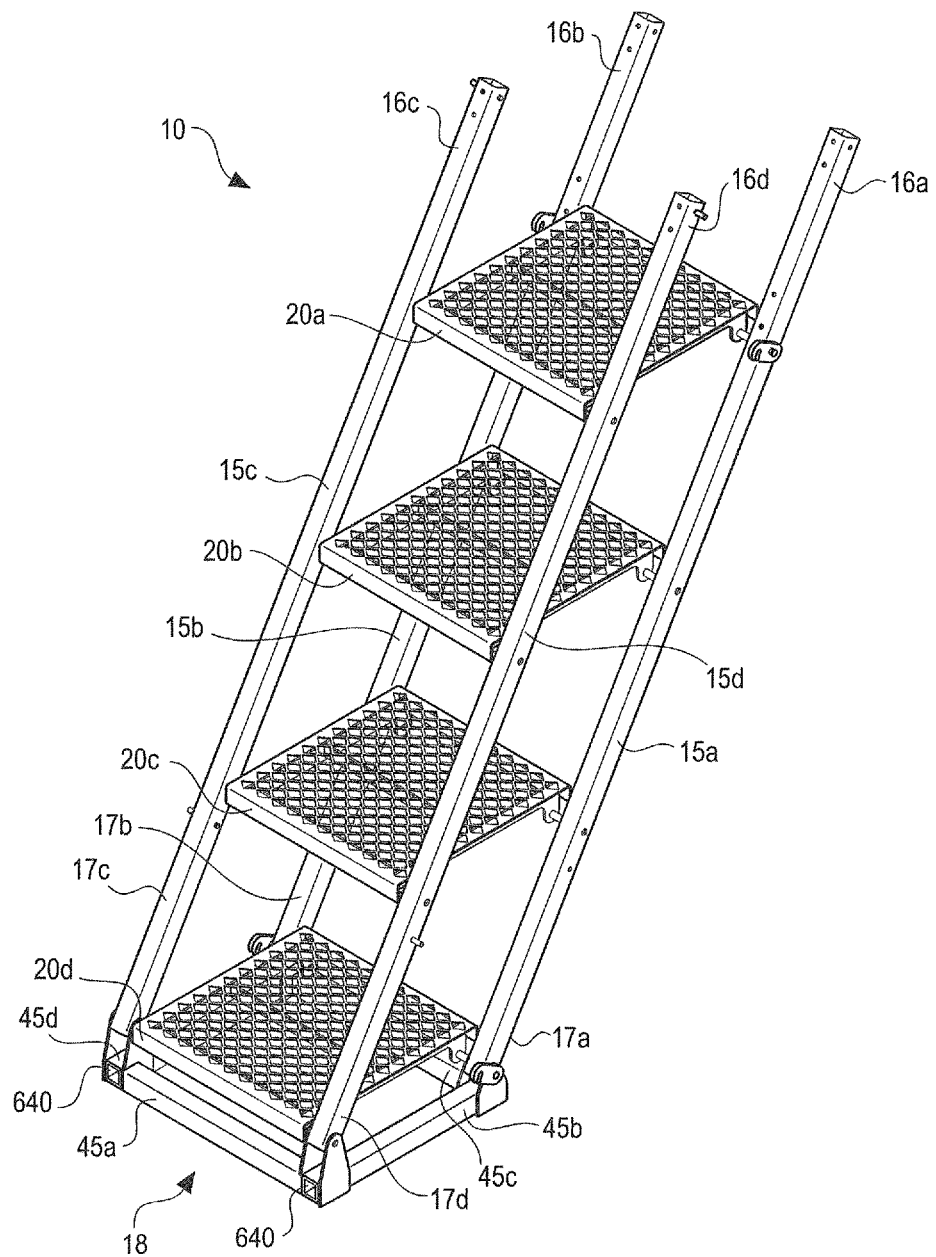
FIG. 19 is a perspective view of a shortened ladder in the deployed position with the base side members having receivers for receiving accessory bars.
Figure 30:
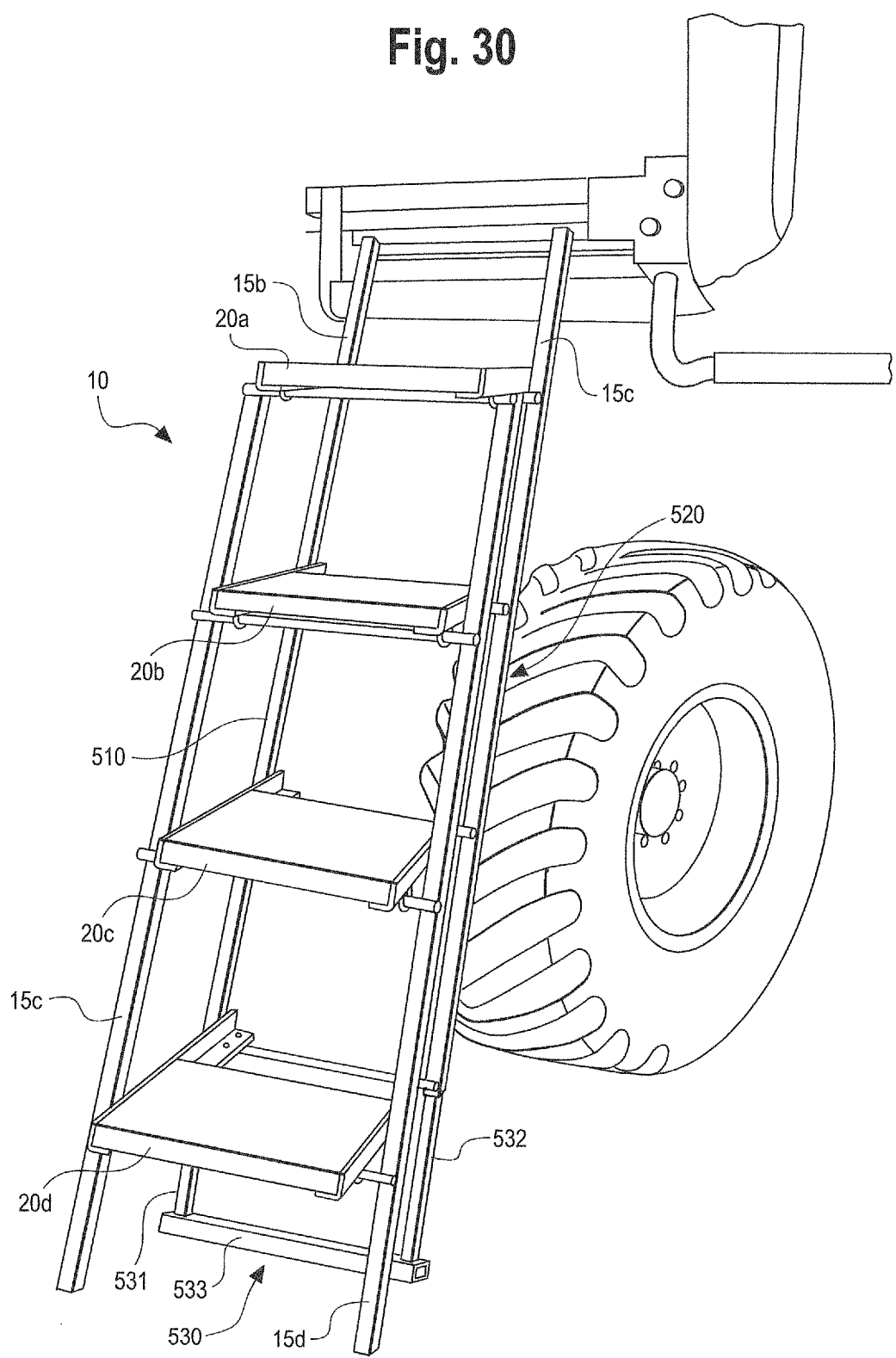
FIG. 30 is a perspective view of a ladder of an alternate embodiment, the ladder including a 6 inch deep tread, the ladder attached to a piece of heavy equipment.

As shown in FIGS. 20 and 21, the accessory bars 600 include pivoting wheels or casters 645 to allow the ladder 10 to be used as a creeper. The wheels 645 preferably are low profile and are positioned near the corners of the accessory bar 600 to allow for a more stable platform. One of the accessory bars 600 includes a headrest 650. The headrest 650 is preferably attached by a bracket 647 to the accessory bar 600 that attaches to the base 18. In the preferred embodiment, the bracket 647 elevates the headrest 650 from the accessory bar 600 so that the headrest 650 is positioned above the step 20d when the accessory bar 600 is attached to the ladder 10. In the preferred embodiment, the headrest 650 is thus displaced both vertically and horizontally from the position of the accessory bar cross member 610. In such a case the headrest bracket 647 is "L" shaped. In other embodiments, the headrest bracket 674 is removable from the accessory bar 600. In such a case, the accessory bar 600 is equipped with a receiver to receive the headrest bracket 647. In other embodiments, the headrest bracket 647 is height adjustable to allow the height of the headrest 650 above the step 20d to be adjusted. This may be accomplished by providing the headrest bracket 647 with a plurality of spaced apart apertures, and providing the headrest bracket receiver with a corresponding aligning aperture for the insertion and removal of a locking pin, similar to the arrangement use for the height adjustment of the ladder 10 and shown in FIG. 18.

While the headrest equipped accessory bar 600 has been shown as attached to the base 18, the headrest equipped accessory bar 600 may also be attached to the ladder rails 15a and 15b at the opposite end of the ladder 10. In such an instance, the non-headrest equipped accessory bar is attached to the base 18.

With reference to FIGS. 22-24, the accessory bars 600 may be equipped with an axle 652 and larger non swiveling wheels 653 to convert the ladder 10 into a cart. Such an example is shown with accessory bar 602. In the preferred embodiment, the axle 652 extends away from the sides of the accessory bar 602. In other embodiments, one or all of the accessory bars 600 includes swiveable wheels 645 to allow easy maneuverability of the cart. For instance a first accessory bar 602 will include non swiveling wheels 653 on an axle 652, and the other accessory bar 601 will include swiveable wheels 654 such as casters. In any of the cart embodiments, one of the accessory bars 600 will include a handle 660. In the figures shown, the handle 660 is attached to the accessory bar 601 that includes swiveable wheels 654. The handle 660 is pivotably attached to be placed in a secured upright position, and also be allowed to pivot downward when the locking mechanism is released. It is preferred that the handle 660 freely be allowed to pivot in the unlocked position to allow the handle 660 to be placed a varying heights when connected to a hitch 662, as shown in FIG. 24, for use of the ladder 10 as a cart that is towable by a tractor or other conveyance having a hitch 662 or other attachment point.

As shown in FIGS. 25-31, the ladder 10 can be attached to a piece of heavy equipment, such as farm machinery, and not have a base as shown in the first embodiment. In other respects, it is similar to the first embodiment. The attachment to the heavy equipment may be accomplished in any of the ways described previously, including with wheels to interact with a track as previously described. Such wheels and track allow the ladder to be pivotably mounted to the heavy equipment. This allows the ladder to be set at various angles, and lifted up to a position parallel to the tracks, and slid along the tracks for storage in the platform or storage configuration. The ladder 10 has a first frame 510 and a second frame 520. The first frame is formed by side rails 15 c and 15 d, connected by a plurality of support rods, 25 a-f. The support rods 25 a-f pivotably support the steps 20a-f, however, the bracket or frames of the steps do not need to have off set apertures to accommodate the offset in the base, since there is no base in this embodiment. As shown in FIG. 28, the support rods 25a and 25g are attached to step 20 in a plane that is generally parallel to the tread surface of the step 20, as there is no offset as in the first embodiment. It is preferable that the support rods 25a-l are connected to the respective steps approximately ¾ of an inch from the ends of the step 20 and that the support rods 25a-l are spaced approximately 12 inches apart. However, these dimensions can be altered to accommodate different design parameters.

Figure 31:
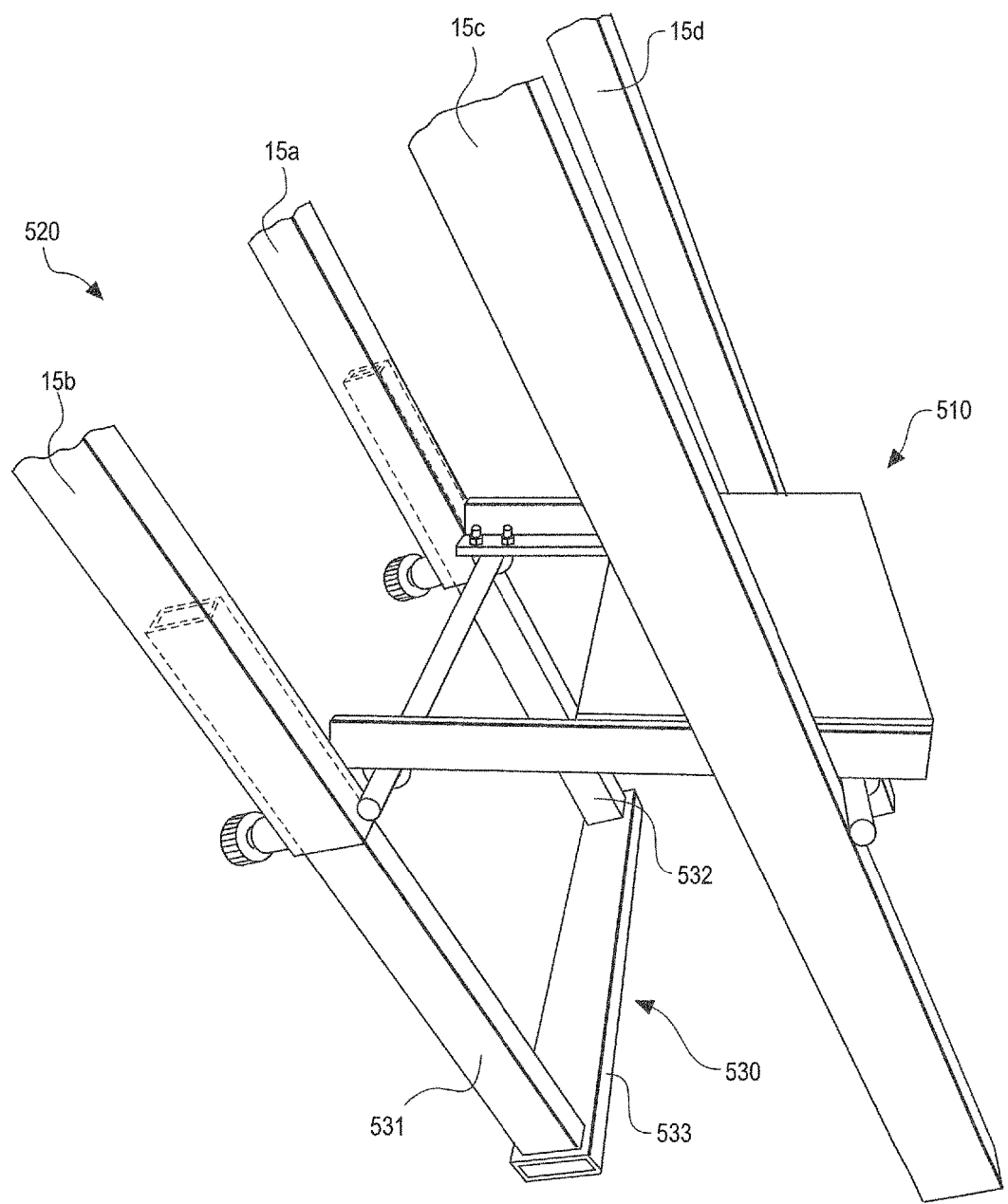
FIG. 31 is a side perspective view of a ladder of an alternate embodiment as shown in FIGS. 25-30, the ladder including a bottom extension rail.

In another embodiment, as shown in FIG. 31, the step 20 has a tread plate that does not extend completely from support rod to support rod as the tread plate is approximately 6 inches in length. Put another way, the step 20 has only a partial tread plate. The partial tread plate preferably extends from the portion of the step 20 closest to the first frame 510. However, the partial tread plate may alternatively extend from the portion of the step closest to the second frame 520. In either case, the step 20 includes side members that extend from support rod to support rod, similar to those shown in FIG. 4, but without the offset apertures 26 and 27.

The second frame 520 is similarly constructed, the support rods numbered 25 g-l In this embodiment, it is preferable that the ladder first frame 510 and ladder second frame 520 nest in the same plane when the ladder is in the storage configuration in order to reduce the overall height of the stowed ladder. Thus, rather than having the first and second ladder frames rest on top of one another as in the first embodiment, the ladder rails 15a-d lie next to each other, generally in the same plane. In order to accomplish this nesting of the first frame 510 and second frame 520, the support rods 25a-f and 25 g-l are attached to an outer surface of the side rails 15c-d for the first frame 510 and 15a-b for the second frame 520. As shown in FIGS. 26 and 27, the upper surface of the side rails is the area of attachment. In the preferred embodiment, the width of the first frame 510 is wider than that of the second frame 520, thus allowing the second frame 520 to nest within the first frame 510 when the ladder 10 is folded for storage.

The second frame 520 also includes an adjustable extension bar 530 that is a generally u shaped piece that includes a cross member 533 and two spaced apart uprights or extensions 531 and 532. The uprights or extensions are inserted into the bottom end 17 of the side rails 15a and 15b of the second frame 520 and moveable within the side rails to allow for adjustment in the length the extension bar 530 extends from the bottom of the second frame 520. The extension bar 530 is adjustable by any means known in the art, including holes and pins, similar to that shown in FIG. 18.

The embodiments described herein are merely examples and are not meant to limit the scope of the invention.

We claim:

1. A ladder to allow a user to access heavy equipment from the ground, the ladder convertible from a ladder configuration to a storage configuration, including:
   A first and second ladder frame, each having a first end and a second end, each ladder frame including two rails connected by a plurality of support rods,
   A plurality of steps, each step rotatably connected to a first support rod selected from the plurality of support rods on the first ladder frame and to a second support rod selected from the plurality of support rods on the second ladder frame, each step having a length perpendicular to the first support rod, the distance between the first and second support rods connected by each step being substantially equal to the length of each step,
   The first end of the second ladder frame being pivotably connected to the heavy equipment,
   The first and second ladder frames maintaining a parallel relationship as the ladder is converted from the ladder configuration to the storage configuration.

2. The ladder of claim 1, the ladder further including a height adjustable extension bar mounted at the second end of the second frame, the extension bar including uprights for insertion into the rails of the second frame, the uprights connected by a cross member, the cross member resting on the ground when the ladder is in the ladder configuration.

3. The ladder of claim 2, wherein the first frame also rests upon the ground when the ladder is in the ladder configuration.

4. The ladder of claim 1, wherein the first frame and second frame lie in a plane when the ladder is in the storage configuration.

5. The ladder of claim 1, wherein the second frame is wider than the first frame.

6. The ladder of claim 1, wherein the plurality of support rods are mounted on an outside surface of the rails.

7. The ladder of claim 1, the ladder further including a height adjustable extension bar mounted at the second end of the second frame, the extension bar including uprights inserted into the second ends of the rails of the second frame, the uprights connected by a cross member, the cross member resting on the ground when the ladder is in the ladder configuration.

8. A ladder for use with heavy equipment to allow a user to get onto the heavy equipment from the ground, the ladder convertible from a ladder configuration to a storage configuration, including:
   A first and second ladder frame, each having a first end and a second end, each ladder frame including two rails connected by a plurality of support rods,
   A plurality of steps, each step connected to a first support rod selected from the plurality of support rods on the first ladder frame and to a second support rod selected from the plurality of support rods on the second ladder frame, each step having a length perpendicular to the first support rod, the distance between the first and second support rods connected by each step being substantially equal to the length of each step,
   Each step positioned to rotate between the rails of the first ladder frame,
   The first end of the second ladder frame being pivotably connected to the heavy equipment,
   The first and second ladder frames maintaining a parallel relationship as the ladder is converted from the ladder configuration to the storage configuration.

9. The ladder of claim 8, the ladder further including a height adjustable extension bar mounted at the second end of the second frame, the extension bar including uprights for insertion into the rails of the second frame, the uprights connected by a cross member, the cross member resting on the ground when the ladder is in the ladder configuration.

10. The ladder of claim 9, wherein the first frame also rests upon the ground when the ladder is in the ladder configuration.

11. The ladder of claim 8, wherein the first frame and second frame lie in a plane when the ladder is in the storage configuration.

12. The ladder of claim 8, wherein the second frame is wider than the first frame.

13. The ladder of claim 8, wherein the plurality of support rods are mounted on an outside surface of the rails.

14. The ladder of claim 8, wherein the two rails of the first frame and the two rails of the second frame all lie in a single plane when the ladder is in a storage configuration.

* * * * *